(12) United States Patent
Harrison et al.

(10) Patent No.: US 10,684,152 B2
(45) Date of Patent: Jun. 16, 2020

(54) FLUID ANALYSIS WITH CORIOLIS EFFECT FLOWMETER

(71) Applicant: Schlubmerger Technology Corporation, Sugar Land, TX (US)

(72) Inventors: Christopher Harrison, Auburndale, MA (US); Matthew T. Sullivan, Westwood, MA (US); Shunsuke Fukagawa, Yokohama (JP)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 310 days.

(21) Appl. No.: 15/134,040

(22) Filed: Apr. 20, 2016

(65) Prior Publication Data

US 2017/0306751 A1    Oct. 26, 2017

(51) Int. Cl.
*G01F 1/84*      (2006.01)
*E21B 49/08*   (2006.01)

(52) U.S. Cl.
CPC .......... *G01F 1/8472* (2013.01); *E21B 49/082* (2013.01); *G01F 1/844* (2013.01); *G01F 1/8409* (2013.01)

(58) Field of Classification Search
CPC .............................. G01F 1/8472; E21B 49/082
See application file for complete search history.

(56) References Cited

U.S. PATENT DOCUMENTS

| | | | |
|---|---|---|---|
| 4,994,671 | A | 2/1991 | Safinya et al. |
| 7,384,453 | B2 | 6/2008 | Bostrom et al. |
| 7,575,681 | B2 | 8/2009 | Angelescu et al. |
| 7,637,151 | B2 | 12/2009 | Raghuraman et al. |
| 8,028,562 | B2 | 10/2011 | Shah et al. |
| 8,262,909 | B2 | 9/2012 | Angelescu et al. |
| 8,910,514 | B2 | 12/2014 | Sullivan et al. |
| 9,638,681 | B2 | 5/2017 | Zhdaneev et al. |
| 2010/0265492 | A1 | 10/2010 | Schroeder et al. |
| 2010/0268469 | A1* | 10/2010 | Harrison ............... G01N 9/002 702/12 |
| 2014/0027110 | A1* | 1/2014 | Ageev ..................... H05H 1/52 166/249 |
| 2014/0260586 | A1* | 9/2014 | Van Hal ................ E21B 49/082 73/152.07 |
| 2018/0003538 | A1* | 1/2018 | Schollenberger ......... G01F 1/74 |

FOREIGN PATENT DOCUMENTS

WO    WO2014158376 A1    10/2014

* cited by examiner

*Primary Examiner* — Marc Anthony Armand

(57) ABSTRACT

A downhole tool includes a membrane to separate water from a formation fluid and a meter that operates as a densitometer and a Coriolis effect flowmeter.

21 Claims, 24 Drawing Sheets

(Section A-A)

(Section B-B)

(Section C)

(Section D)

FLUID ANALYSIS WITH CORIOLIS EFFECT FLOWMETER

BACKGROUND

The oil and gas industry has developed various tools capable of determining formation fluid properties. For example, borehole fluid sampling and testing tools such as Schlumberger's Modular Formation Dynamics Testing (MDT) Tool can provide important information on the type and properties of reservoir fluids in addition to providing measurements of reservoir pressure, permeability, and mobility. These tools may perform measurements of the fluid properties downhole, using sensor modules on board the tools. These tools can also withdraw fluid samples from the reservoir that can be collected in bottles and brought to the surface for analysis. The collected samples are routinely sent to fluid properties laboratories for analysis of physical properties that include, among other things, oil viscosity, gas-oil ratio, mass density or API gravity, molecular composition, $H_2S$, asphaltenes, resins, and various other impurity concentrations.

Characterizing a fluid in a laboratory utilizes an arsenal of devices, procedures, trained personnel, and laboratory space. Successfully characterizing a fluid in a wellbore uses methods, apparatus, and systems configured to perform similarly with less space and personal attention and to survive in conditions that quickly destroy traditional lab equipment.

SUMMARY

In accordance with example embodiments, a downhole tool is configured to characterize a formation fluid in a wellbore. The downhole tool includes: a flow line; a membrane configured to allow a formation fluid to pass into the flow line while blocking water from entering the flow line; a density and mass flow meter configured to receive the formation fluid from the flow line; and a processing system. The density and mass flow meter includes: a resonator tube configured to receive the fluid sample; a magnet configured to apply a magnetic field to the resonator tube; an excitation source configured to apply an electrical excitation current to the resonator tube in the presence of the magnetic field to oscillate the resonator tube in a first oscillation mode; and a sensor system configured to sense vibration of the resonator tube in response to the application of the electrical excitation current. The processing system is configured to (a) calculate mass flow rate of the formation fluid based on vibration sensed by the sensor system and (b) calculate density of the formation fluid based on vibration sensed by the sensor system.

In accordance with example embodiments, a downhole tool is configured to characterize a formation fluid in a wellbore. The downhole tool includes: a flow line configured to receive the formation fluid; a piston configured to control pressure of the formation fluid in the flow line; a pressure gauge configured to measure the pressure of the formation fluid in the flow line and to provide information to control the piston; a membrane in communication with the flow line and configured to allow the formation fluid to pass through the membrane while blocking water from passing through the membrane; a density and mass flow meter configured to receive the formation fluid after the formation fluid has passed through the membrane; and a processing system. The density and mass flow meter includes: a resonator tube configured to receive the fluid sample; a magnet configured to apply a magnetic field to the resonator tube; an excitation source configured to apply an electrical excitation current to the resonator tube in the presence of the magnetic field to oscillate the resonator tube in a first oscillation mode; and a sensor system configured to sense vibration of the resonator tube in response to the application of the electrical excitation current. The processing system is configured to (a) calculate mass flow rate of the formation fluid based on vibration sensed by the sensor system and (b) calculate density of the formation fluid based on vibration sensed by the sensor system.

In accordance with example embodiments, a downhole tool is configured to measure a fluid property in a wellbore. The downhole tool includes: a main flow line configured to convey a borehole fluid within the downhole tool; a secondary flowline configured to receive a diverted portion of the fluid from the main flow line; a membrane in communication with the secondary flow line and configured to allow the formation fluid to pass through the membrane while blocking water from passing through the membrane; a density and mass flow meter configured to receive the formation fluid after the formation fluid has passed through the membrane; and a processing system. The density and mass flow meter includes: a resonator tube configured to receive the formation fluid; a magnet configured to apply a magnetic field to the resonator tube; an excitation source configured to apply an electrical excitation current to the resonator tube in the presence of the magnetic field to oscillate the resonator tube in a first oscillation mode; and a sensor system configured to sense vibration of the resonator tube in response to the application of the electrical excitation current. The processing system is configured to (a) calculate mass flow rate of the formation fluid based on vibration sensed by the sensor system and (b) calculate density of the formation fluid based on vibration sensed by the sensor system.

Further features and aspects of example embodiments of the present invention are described in more detail below with reference to the appended Figures.

FIGURES

DESCRIPTION

At the outset, it should be noted that in the development of any such actual embodiment, numerous implementation-specific decisions may be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the composition used/disclosed herein can also comprise some components other than those cited. In the summary and detailed description, each numerical value should be read once as modified by the term "about" (unless already expressly so modified), and then read again as not so modified unless otherwise indicated in context. Also, in the summary and detailed description, it should be understood that a concentration range listed or described as being useful, suitable, or the like, is intended that any concentration within the range, including the end points, is to be considered as having been stated. For example, "a range of from 1 to 10" is to be read as indicating each possible number along the continuum between about 1 and about 10. Thus, even if specific data points within the range, or even no data points within the range, are explicitly identified or refer to a few specific points, it is to be understood that inventors appreciate and understand that any and all data points within the range are to be considered to have been specified, and that inventors possessed knowledge of the entire range and all points within the range.

Figure 1:
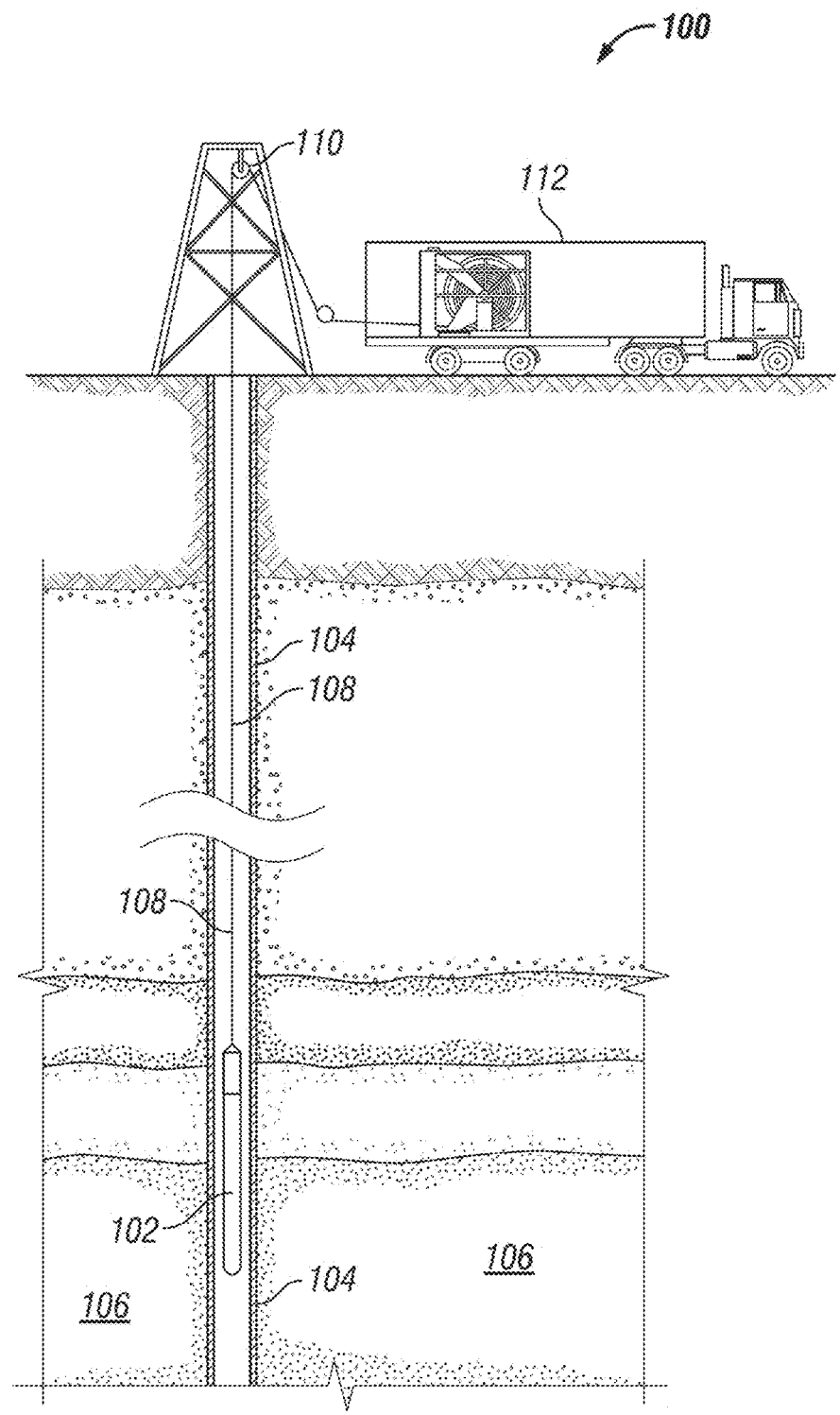
FIG. 1 shows a wireline logging system at a well site in accordance with an embodiment of the present disclosure.

FIG. 1 shows one example of a wireline logging system 100 at a well site. Such a wireline logging system 100 can be used to implement a rapid formation fluid analysis. In this example, a wireline tool 102 is lowered into a wellbore 104 that traverses a formation 106 using a cable 108 and a winch 110. The wireline tool 102 is lowered down into the wellbore 104 and makes a number of measurements of the adjacent formation 106 at a plurality of sampling locations along the wellbore 104. The data from these measurements is communicated through the cable 108 to surface equipment 112, which may include a processing system for storing and processing the data obtained by the wireline tool 102. The surface equipment 112 includes a truck that supports the wireline tool 102. In other embodiments, the surface equipment may be located in other locations, such as within a cabin on an off-shore platform.

Figure 2:
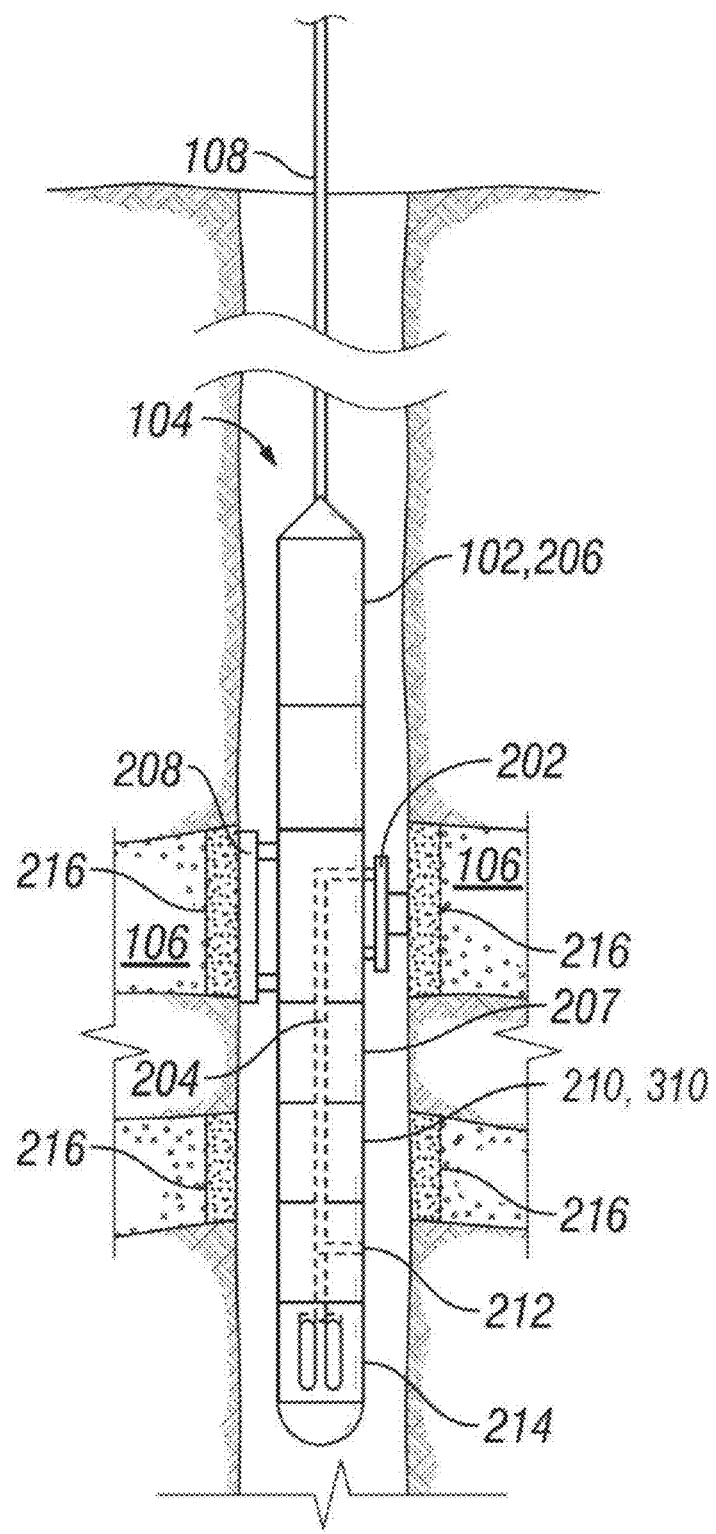
FIG. 2 shows a wireline tool in accordance with an embodiment of the present disclosure.

FIG. 2 shows a more detailed view of the wireline tool 102. The wireline tool 102 includes a selectively extendable fluid admitting assembly (e.g., probe) 202. This assembly 202 extends into the formation 106 and withdraws formation fluid from the formation 116 (e.g., samples the formation). The fluid flows through the assembly 202 and into a main flow line 204 within a housing 206 of the tool 102. A pump module 207 is used to withdraw the formation fluid from the formation 106 and pass the fluid through the flow line 204. The wireline tool 102 may include a selectively extendable tool anchoring member 208 that is arranged to press the probe 202 assembly against the formation 106.

The wireline tool 102 also includes a fluid analyzer module 210 for analyzing at least a portion of the fluid in the flow line 204. This fluid analyzer module 210 is further described below. After the fluid analysis module 210, the formation fluid may be pumped out of the flow line 204 and into the wellbore 104 through a port 212. Some of the formation fluid may also be passed to a fluid collection module 214 that includes chambers for collecting fluid samples and retaining samples of the formation fluid for subsequent transport and testing at the surface (e.g., at a testing facility or laboratory).

Figure 3A:
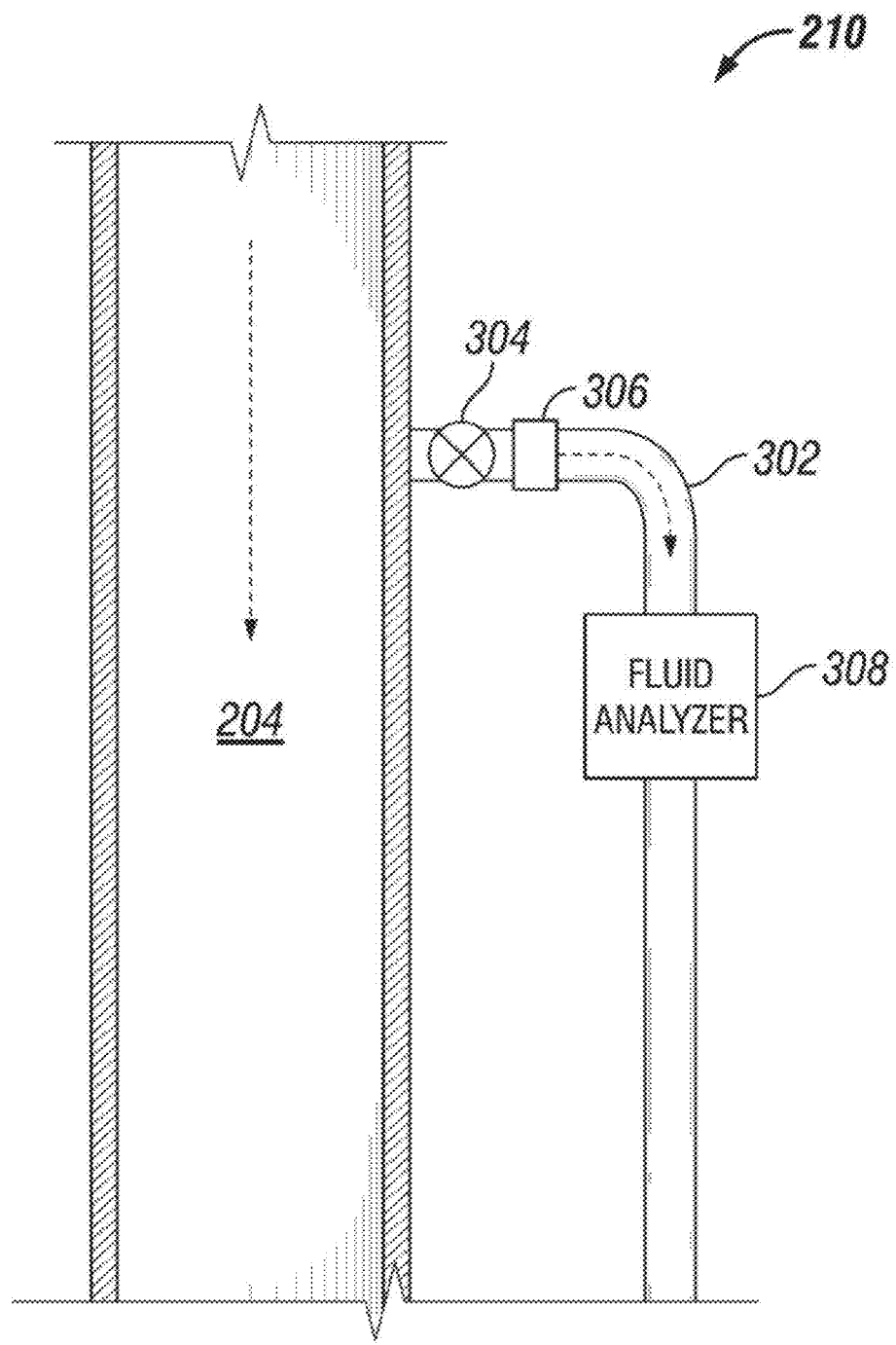
FIG. 3A shows a fluid analyzer module in accordance with an embodiment of the present disclosure.

FIG. 3A shows a more detailed view of a fluid analysis module 210. As shown in FIG. 3A, the fluid analysis module 210 includes a secondary flow line 302 (e.g., a channel) that is coupled through a valve 304 to the main flow line 204. The valve 304 selectively passes a sample of formation fluid into the secondary flow line 302. The secondary flow line 302 also includes a membrane 306 to separate water from the formation fluid sample (e.g., a hydrophobic membrane). Such a membrane is described in U.S. Pat. No. 7,575,681 issued on Aug. 18, 2009 and U.S. Pat. No. 8,262,909 issued on Sep. 11, 2012, each of which is hereby incorporated by reference in its entirety.

In some embodiments, a pump or a piston is used to extract the formation fluid sample from the main flow line 204 and pass the formation fluid through the membrane 306. In various embodiments, the membrane 306 separates water from the formation fluid sample as the sample is being extracted from the main flow line 304. Also, although the membrane 304 is disposed after the valve 304, it should be appreciated that in some embodiments the membrane 306 is disposed before the valve 304. Moreover, although a single membrane 306 is provided in FIG. 3A, it should be understood that some embodiments include multiple membranes.

Once the formation fluid sample passes the membrane 306, the sample flows into a fluid analyzer 308 that analyzes the sample to determine at least one property of the fluid sample. The fluid analyzer 308 is in electronic communication with the surface equipment 112 through, for example, a telemetry module and the cable 108. Accordingly, the data produced by the fluid analyzer 308 can be communicated to the surface for further processing by processing system.

The fluid analyzer 308 can include a number of different devices and systems that analyze the formation fluid sample. For example, in some embodiments, the fluid analyzer 308 includes a spectrometer that uses light to determine a composition of the formation fluid sample. The spectrometer can determine an individual fraction of methane ($C_1$), an individual fraction of ethane ($C_2$), a lumped fraction of alkanes with carbon numbers of three, four, and five ($C_3$-$C_5$), and a lumped fraction of alkanes with a carbon number equal to or greater than six ($C_{6+}$). An example of such a spectrometer is described in U.S. Pat. No. 4,994,671 issued on Feb. 19, 1991 and U.S. Patent Application Publication No. 2010/0265492 published on Oct. 21, 2012, each of which is incorporated herein by reference in its entirety. In some embodiments, the fluid analyzer 308 includes a gas chromatograph that determines a composition of the formation fluid. In some embodiments, the gas chromatograph determines an individual fraction for each alkane within a range of carbon numbers from one to 25 ($C_1$-$C_{25}$). Examples of such gas chromatographs are described in U.S. Pat. No. 8,028,562 issued on Oct. 4, 2011 and U.S. Pat. No. 7,384,453 issued on Jun. 10, 2008, each of which is hereby incorporated by reference in its entirety. The fluid analyzer 308 may also include a mass spectrometer, a visible absorption spectrometer, an infrared absorption spectrometer, a fluorescence spectrometer, a resistivity sensor, a pressure sensor, a temperature sensor, a densitometer, a flowmeter, and/or a viscometer. The fluid analyzer 308 may also include combinations of such devices and systems. For example, the fluid analysis module 210 may include a spectrometer followed by a gas chromatograph as described in, for example, U.S. Pat. No. 7,637,151 issued on Dec. 29, 2009 and U.S. patent application Ser. No. 13/249,535 filed on Sep. 30, 2011, each of which is incorporated herein by reference in its entirety.

Figure 3B:
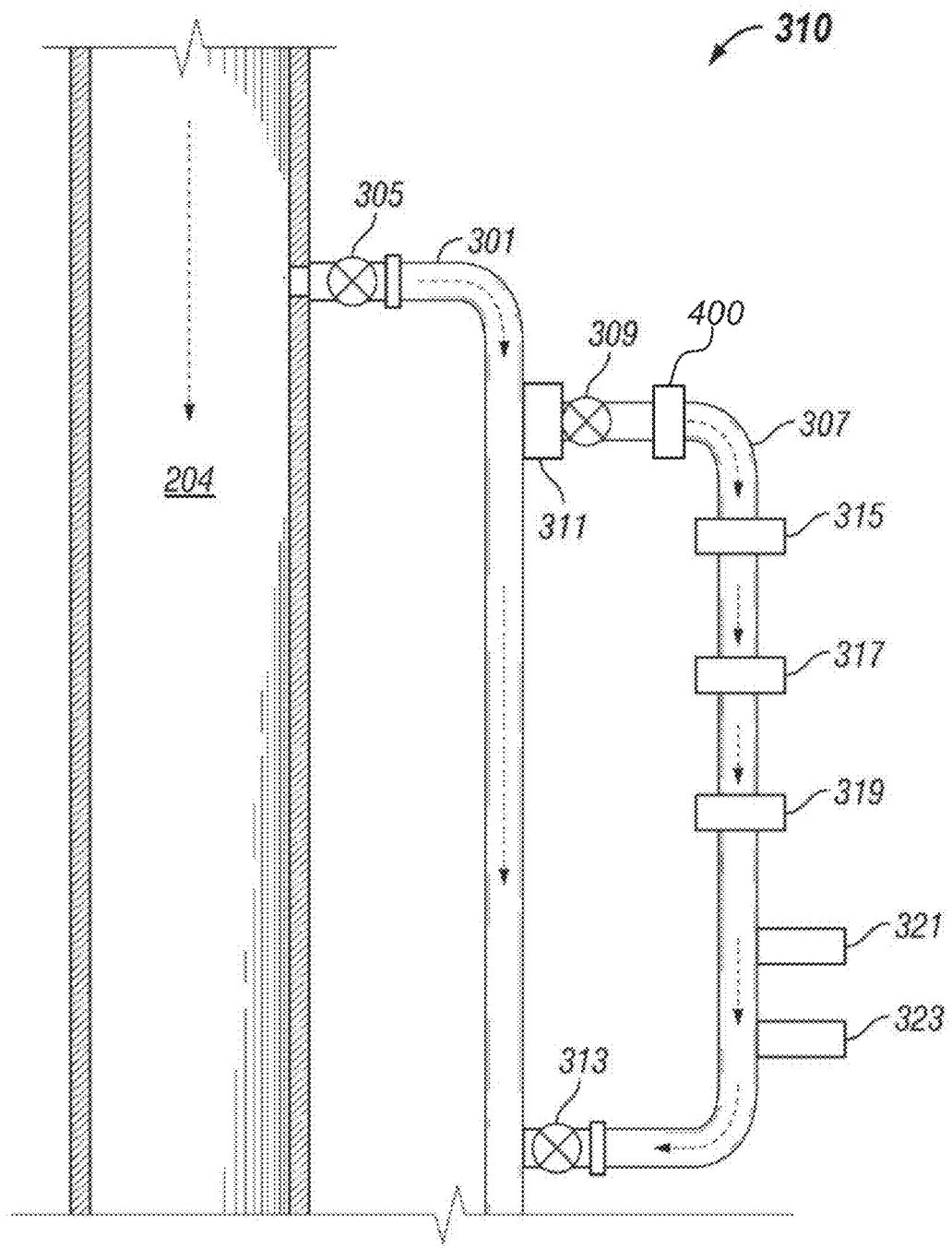
FIG. 3B shows a fluid analyzer module in accordance with another embodiment of the present disclosure.

FIG. 3B shows a fluid analysis module 310 in accordance with another embodiment of the present disclosure. In this example, a bypass flow line 301 is coupled to the main flow line 204 through a first valve 305. The first valve 305 selectively passes formation fluid from the main flow line 204 into the bypass flow line 301. A secondary flow line 307 (e.g., a channel) is coupled through a second valve 309 (e.g., an entrance valve) to the bypass flow line 301. The second valve 309 selectively passes a sample of formation fluid into the secondary flow line 307. The fluid analysis module 310 includes a membrane 311 to separate water from the formation fluid sample (e.g., a hydrophobic membrane). In this embodiment, the membrane 311 is disposed before the second valve 309. The fluid analysis module 310 also includes a third valve 313 (e.g., an exit valve) between the secondary flow line 307 and the bypass flow line 301. The second valve 309 and the third valve 313 can be used to isolate the formation fluid sample within the secondary flow line 307. After analysis, the formation fluid sample can pass to the bypass flow line 301 through the third valve 313.

In the example of FIG. 3B, the fluid analysis module 310 further includes a flowmeter 400 followed by a spectrometer 315, a densitometer 317 and a viscometer 319. Such an arrangement provides both a chemical composition for the fluid sample and physical characteristics for the fluid sample (e.g., density and viscosity). As explained above, other combinations of devices and systems that analyze the formation fluid sample are also possible.

In FIG. 3B, the fluid analysis module 310 also includes a pressure unit 321 for changing the pressure within the fluid sample and a pressure sensor 323 that monitors the pressure of the fluid sample within the secondary flow channel 307. In some embodiments, the pressure unit 321 is a piston that is in communication with the secondary flow line 307 and that expands the volume of the fluid sample to decrease the pressure of the sample. As explained above, the second valve 309 and the third valve 313 can be used to isolate the formation fluid sample within the secondary flow line 307. Also, in some embodiments, the pressure unit 321 can be used to extract the formation fluid sample from the bypass flow line 301 by changing the pressure within the secondary flow line 307. The pressure sensor 323 is used to monitor the pressure of the fluid sample within the secondary flow line 307. The pressure sensor 323 can be a strain gauge or a resonating pressure gauge. By changing the pressure of the fluid sample, the fluid analyzer module 210 can make measurements related to phase transitions of the fluid sample (e.g., bubble point or asphaltene onset pressure measurements). Further details of devices and systems that analyze the formation fluid sample are also provided in PCT Application Publication No. WO 2014/158376 A1, which is hereby incorporated herein by reference in its entirety.

Referring to FIG. 1, near the bottom of the wellbore 104, the pressure may be sufficiently high that the fluid is single-phase. At a given mid-point (the location of which may vary depending on well properties), the pressure may reach the bubble point when the fluid breaks phase, producing gaseous and liquid phases.

Fluids that may be produced from the formation have their temperature changed as they are brought to the surface, and hence experience a dramatic change in the fluid properties, including but not limited to their density. In order to accurately calculate the flow rate during production, an accurate knowledge of the density as a function of depth is useful. Along with temperature dependence, the fluid pressure may drop below the bubble point while in transit. Some example systems 100 may obtain a fluid sample from the formation and rapidly vary its temperature in order to simulate the fluid's passage through the oilwell during the production stage. In some embodiments, the tool 102 may store a sample extracted from the formation after measurements are performed. The tool 102 may be raised to a shallower depth and allow the sample within the PVT device to come to equilibrium, after which additional measurements may be performed. It should be understood that although the tool 102 in the illustrated examples is a wireline tool, the features of the tool 102 may implemented into any suitable apparatus and may be provided to operate in downhole and/or surface locations.

As an example, a description for measuring density is provided, with a comparison of the amount of energy to change the sample temperature for both mesoscopic and microfluidic approaches. This would apply as well to a bubble point measurement where one is interested in the temperature dependence as well. Some example embodiments described herein may be compared to a conventional viscometer that is macroscopic in size and is directly immersed in the flow-line which has an inner diameter of approximately 5.5 mm. The total amount of fluid to fill the conventional sensors and the surrounding region volume is on the order of 10 milliliters, with an associated heat capacity of, assuming the specific heat of mineral oil, 1.7 Joules/(gram Kelvin), or a heat capacity of approximately 20 Joules/Kelvin. Hence, 20 Joules of energy are removed to reduce the temperature by one degree Kelvin. Furthermore, as the sensors are thermally connected to a large metallic assembly on the order of 1 kilogram (or more), in practice one would reduce the temperature of this assembly as well. Assuming a specific heat of 0.5 Joules/(gram Kelvin) for steel, one would have to remove 500 Joules of energy to reduce the temperature of the whole assembly by one degree. This approach using conventional technologies will be referred to as mesoscopic herein.

As a comparison, microfluidic environments of the embodiments described herein may use fluid volumes on the order of ten microliters, which corresponds to around 10 milligrams of liquid, which has a heat capacity of about 0.02 Joules/Kelvin (using the above numbers for the specific heat). In practice, one controls the temperature of the microfluidic chamber as well, which may have a mass on the order of 50 grams, and assuming this is fabricated from titanium, with a specific heat of 0.5 Joules/(gram Kelvin), it would use on the order of 25 Joules of energy to change the temperature by one degree. Note that this power usage for the microfluidic approach is 20 times smaller than for mesoscopic approach. Peltier (or thermoelectric) coolers reveals that models with dimensions with the proper scale exist and are specified to produce heat fluxes on the order of 1 Joule/second (1 watt), and one may quickly ramp up or down the temperature of such a device. Hence, a rapid ramping up or down of the temperature of a microfluidic-scale of fluidic volume and associated chamber is feasible.

As indicated above, during a process of sampling fluid into the microfluidic system 210, 310 of the tool 102, a fluid may be sampled from the formation 106. In some embodiments, a small volume (on the order of tens of microliters) of fluid will be sampled, filtered, and passed into the microfluidic system 210, 310. The system 210, 310 may be placed into a pressure compensation system where during the initial phase of its operation, the pressure is approximately 100 psi lower (or less) than the flowline of the tool in which it will be implemented. As discussed above, the microfluidic system 210, 310 may include microfluidic sensors to measure the density, viscosity or any other physical properties of the fluid. The microfluidic system 210, 310 may either be located downhole or at the surface.

For downhole applications, the fluid evaluation may be motivated by the fact that wellbore temperature changes substantially from the formation to the surface. Fluids that are produced from the formation change their temperature accordingly and hence experience a dramatic change in their properties, including but not limited to their density. In order to accurately calculate the flow rate during production one should accurately know the density as a function of depth. This is further complicated by the fact that the fluid may drop below the bubble point while in transit. Hence, a system may be selected that can obtain a fluid sample from the formation and rapidly vary its temperature in order to simulate its passage through the wellbore during the production stage.

Generally, examples disclosed herein relate to collecting a fluid from a wellbore, a fracture in a formation, a body of water or oil or mixture of materials, or other void in a subterranean formation that is large enough from which to collect a sample. The fluid may contain, for example, solid particles such as sand, salt crystals, proppant, solid acids, solid or viscous hydrocarbon, viscosity modifiers, weighing agents, completions residue, or drilling debris. The fluid may contain, for example, water, salt water, hydrocarbons, drilling mud, emulsions, fracturing fluid, viscosifiers, surfactants, acids, bases, or dissolved gases such as natural gas, carbon dioxide, or nitrogen.

Systems for analyzing these fluids may be located in various locations or environments, including, but not limited to, tools for downhole use, permanent downhole installations, or any surface system that will undergo some combination of elevated pressures, temperatures, and/or shock and vibration. In some embodiments, temperatures may be as high as about 175° C. or about 250° C. with pressures as high as about 25,000 psi.

Collecting and analyzing a small sample with equipment with a small interior volume allows for precise control and rigorous observation when the equipment is appropriately tailored for measurement. At elevated temperatures and pressures, the equipment may also be configured for effective operation over a wide temperature range and at high pressures. Selecting a small size for the equipment is advantageous for rugged operation because the heat transfer and pressure control dynamics of a smaller volume of fluid are easier to control then those of large volumes of liquids. That is, a system with a small exterior volume may be selected for use in a modular oil field services device for use within a wellbore. A small total interior volume can also allow cleaning and sample exchange to occur more quickly than in systems with larger volumes, larger surface areas, and larger amounts of dead spaces. Cleaning and sample exchange are processes that may influence the reliability of the microfluidic system 210, 310. That is, the smaller volume uses less fluid for observation, but also can provide results that are more likely to be accurate.

The minimum production pressure of the reservoir may be determined by measuring the saturation pressure of a representative reservoir fluid sample at the reservoir temperature. In a surface measurement, the reservoir phase envelope may be obtained by measuring the saturation pressure (bubble point or dewpoint pressures) of the sample using a traditional PVT view cell over a range of temperatures. Saturation pressure can be either the bubble or dewpoint of the fluid, depending upon the fluid type. At each temperature, the pressure of a reservoir sample is lowered while the sample is agitated with a mixer. This is done in a view cell until bubbles or condensate droplets are observed (e.g., optically or otherwise) and is known as a Constant Composition Expansion (CCE). The PVT view cell volume is on the order of tens to hundreds of milliliters, thus using a large volume of reservoir sample to be collected for analysis. This sample can be consumed or altered during PVT measurements. A similar volume may be used for each additional measurement, such as density and viscosity, in a surface laboratory. Thus, the small volume of fluid used by microfluidic sensors of the present disclosure (approximately 1 milliliter total for measurements described herein) to make measurements may be highly advantageous.

In one or more embodiments, an optical phase transition cell may be included in a microfluidic PVT tool. It may be positioned in the fluid path line to subject the fluid to optical interrogation to determine the phase change properties and its optical properties. U.S. patent application Ser. No. 13/403,989, filed on Feb. 24, 2012 and United States Patent Application Publication Number 2010/0265492, published on Oct. 21, 2010 describe embodiments of a phase transition cell and its operation. Each of these applications is incorporated herein by reference in its entirety. The pressure-volume-temperature phase transition cell may contain as little as 300 µl, or less, of fluid. The phase transition cell detects the dew point or bubble point phase change to identify the saturation pressure while simultaneously nucleating the minority phase.

The phase transition cell may provide thermal nucleation which facilitates an accurate saturation pressure measurement with a rapid depressurization rate of from about 10 to about 200 psi/second. As such, a saturation pressure measurement (including depressurization from reservoir pressure to saturation pressure) may take place in less than 10 minutes, as compared to the saturation pressure measurement via standard techniques in a surface laboratory, wherein the same measurement may take several hours.

Some embodiments may include a view cell to measure the reservoir asphaltene onset pressure (AOP) as well as the saturation pressures. Hence, the phase transition cell becomes a configuration to facilitate the measurement of many types of phase transitions during a CCE.

In one or more embodiments, the densitometer 317, viscometer 319, a pressure gauge and/or a method to control the sample pressure with a phase transition cell may be integrated so that most sensors and control elements operate simultaneously to fully characterize a live fluid's saturation pressure. In some embodiments, each individual sensor itself (e.g., flowmeter 400, densitometer 317, or viscometer 319) has an internal volume of no more than 20 microliters (approximately 2 drops of liquid) and by connecting each in series, the total volume (500 microliters) to charge the system with live oil before each measurement may be minimized. In some embodiments, the fluid has a total fluid volume of about 1.0 mL or less. In other embodiments, the fluid has a total fluid volume of about 0.5 mL or less.

This configuration is substantially different than a traditional Pressure-Volume-Temperature (PVT) apparatus, but provides similar information (typically, a subset) while reducing the amount of fluid consumed for measurement. FIG. 3A is a schematic of one embodiment of a PVT apparatus for use downhole. In some embodiments, the PVT apparatus may be included into another measurement tool or may be standalone on a drill string or wire line.

The system's 210, 310 small dead volume (less than 0.5 mL) facilitates pressure control and sample exchange. In some embodiments, the depressurization or pressurization rate of the fluid is less than 200 psi/second. In some embodiments, the fluid is circulated through the system at a volumetric rate of no more than 20 ml/sec. In some examples, the fluid is circulated through the system at a volumetric rate of no more than 10 ml/sec. In some examples, the fluid is circulated through the system at a volumetric rate of no more than 1 mL/sec. In some examples, the fluid is circulated through the system at a volumetric rate that is between 20 mL/sec and 1 µL/sec.

Figure 4:
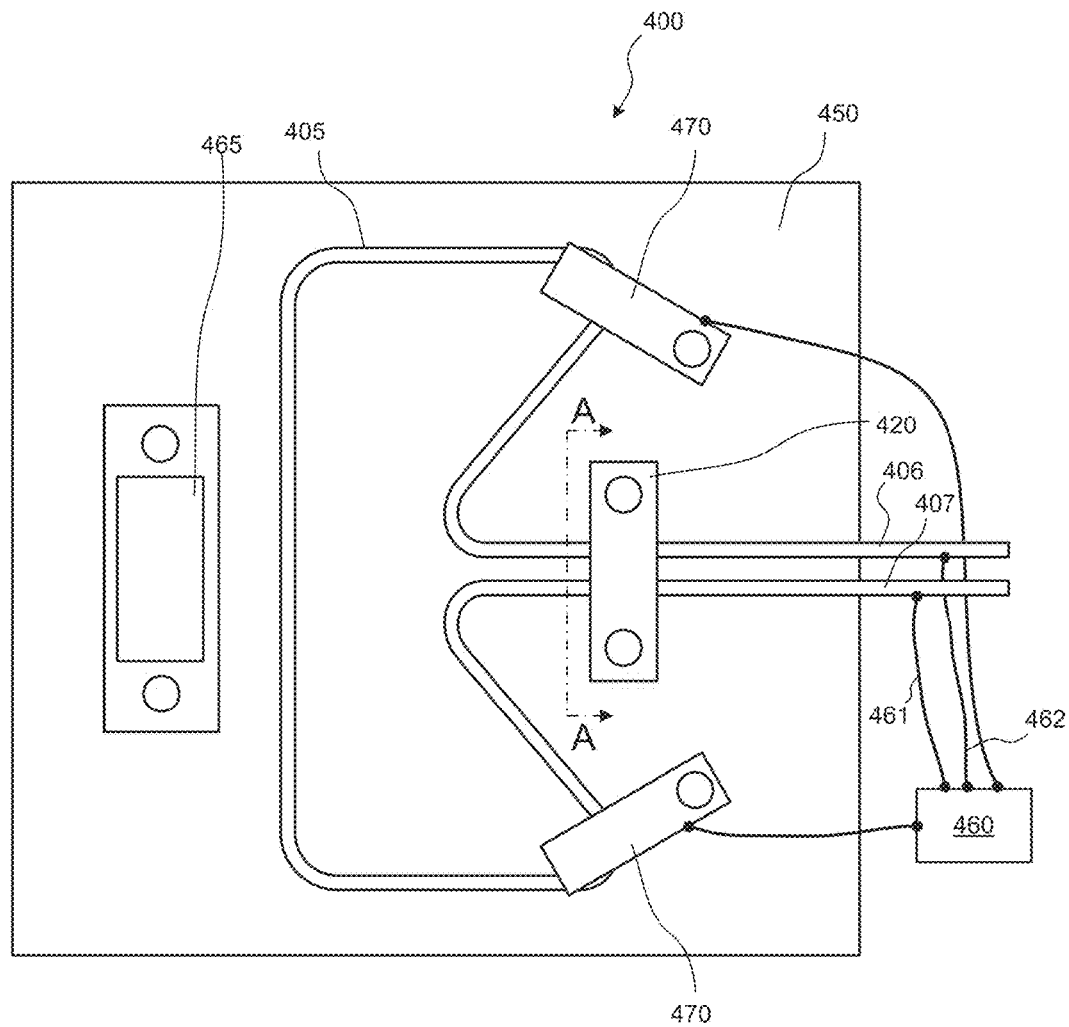
FIG. 4 shows a mass flowmeter.

As mentioned above, the tool of the present disclosure may include a flowmeter 400 (or analogous flowmeter of fluid analyzer 308) to measure fluid flow Referring to FIG. 4, the flowmeter 400 in the illustrated example is a microfluidic Coriolis effect flowmeter that is simple to assemble, operates at elevated temperature and pressure, and can be operated with a lock-in amplifier. The sensor has a flow rate sensitivity greater than 2 degrees per gram/minute and is benchmarked with mass flow rates ranging from 0.05 to 2.0 grams/minute. The internal volume in this example is 15 microliters and may use off-the-shelf optical components to measure the tube motion. Moreover, with proper calibration, and in addition or as an alternative to flow measurement, density can be calculated from the frequency of the resonating element 405, which may be a metal microfluidic tube formed of stainless steel or any other suitable material. In some examples, the resonating element 405 is formed of an electrically insulating material that is coated with a thin conductive metal layer. For example, some resonating elements 405 are formed of a glass tube coated with a thin gold layer.

Studies have been performed to understand the relationship between the sensitivity of Coriolis effect flowmeters to the geometry of the vibrating tube. Analysis has been performed on various sources of error, such as fluid compressibility, and the effects of multiphase flow on the measurement accuracy. The internal volume of flow sensors has been drastically reduced for microfluidic applications, often with a medical focus. To optimize such small sensors, studies have been undertaken to find the region of the sensing element that exhibits the greatest phase shift due to mass flow, thereby allowing technologists to optimize the position of the motion sensing elements. However, such low volume densitometers are typically not ruggedized for field conditions nor designed to operate at elevated temperatures in an oven, or similar conditions such as downhole in a wellbore. High pressure densitometers (non-microfluidic) are routinely used in laboratory settings at elevated temperature, and have recently been introduced for use downhole in an oilwell. The limited volume of oilfield samples (e.g., approximately 500 mL) is suitable for a flowmeter geometry that is able operate with low flowrates while at elevated pressure and temperature. Towards that end, example embodiments of the present invention provide an actuation and detection system that is amenable to high temperature implementation and where the electronics can be easily separated from the sensing element.

Figure 5:
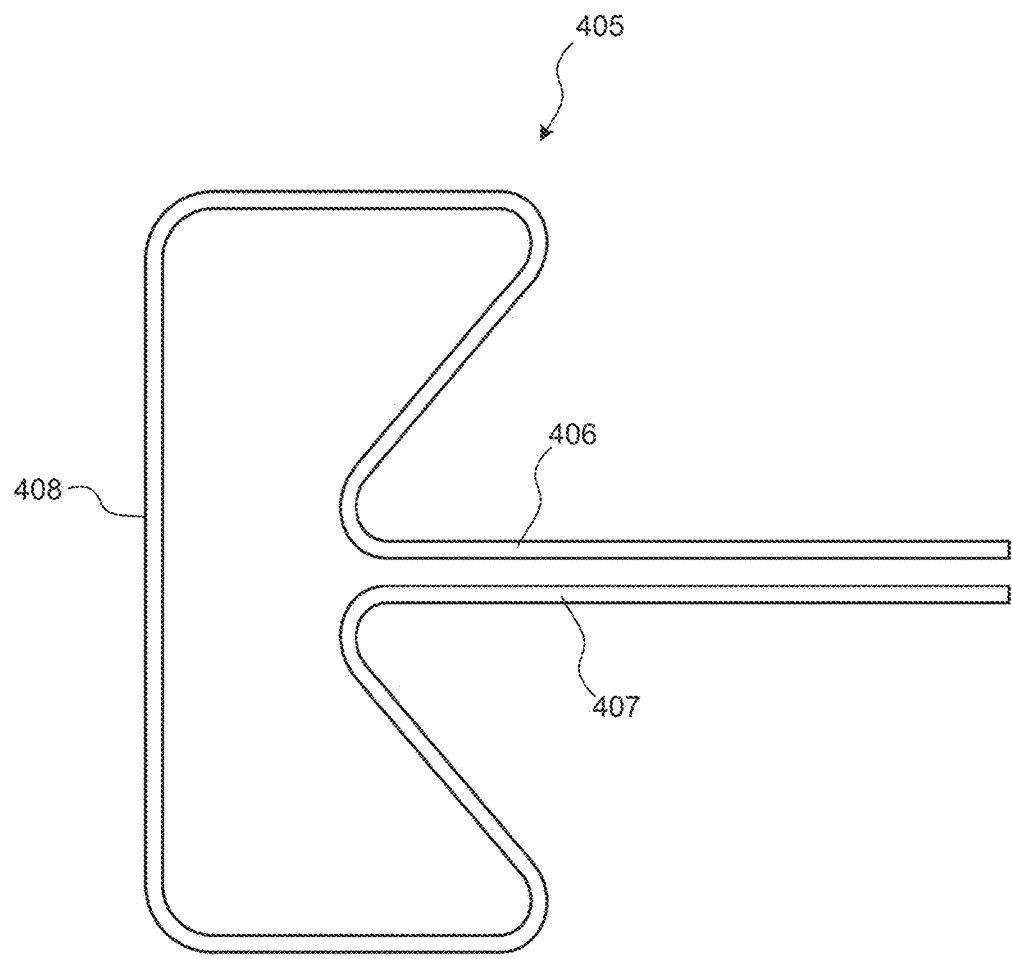
FIG. 5 shows a resonator tube of the flowmeter of FIG. 4.

In an experimental procedure, stainless steel tubing was procured of outer diameter 1/32" and inner diameter 0.020". The tubing was bent about 4-40 studs screwed into a wire forming jig to create the resonating element schematically illustrated as resonating element or resonator 405 in FIG. 5. The annealed temper of the tubing minimized the springback when bending the sensor to the desired form on the jig.

Figure 6:
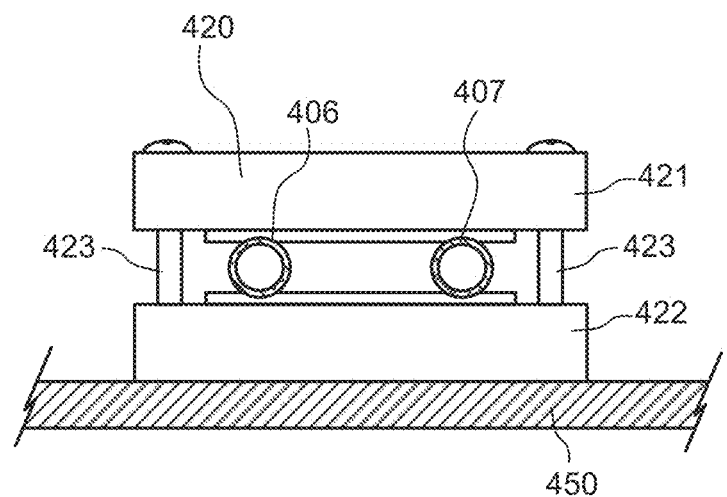
FIG. 6 shows a cross-sectional view corresponding to section A-A of FIG. 4.

Referring to the schematic illustration of FIG. 4, the two base legs 406 and 407 of the resonator 405 are supported at a support base 420. Referring to the schematic illustration of FIG. 6, which is a cross-sectional view corresponding to section A-A of FIG. 4, the support base 420 includes an upper clamp element 421 and a lower clamp element 422. The two clamping elements are clamped toward each other by a pair of fasteners 423, which are screws in this example, although any suitable fastener or fasteners may be provided. The screws 423 extend through the two clamp elements 421 and 422 and into a base plate or substrate 450. In this example, external threads of the screws 423 engage internal threads in the substrate 450 to draw the clamping elements 421 and 422 toward each other, as well as securing the overall support base 420 (and, by extension, the resonating element 405) to the flowmeter substrate 450. Since, as illustrated in FIG. 6, the two legs 406 and 407 are disposed and extend between the upper and lower clamping elements 421 and 422, this clamping force exerted between the two elements 421 and 422 secures the two base legs 406 and 407 in the respective positions shown in FIG. 6. This allows a resonating portion 408 of the resonator 405 to be supported in free space to allow resonation as described in further detail herein.

Electrical isolation from the clamp elements 421 and 422 from the resonator 405 is provided by strips of insulative tape (e.g., Kapton tape), paper, or any other suitable insulating material. The insulating material may be selected to minimize vibrational losses. It should be understood that in accordance with some examples, the clamp elements 421 and 422 are themselves formed (in some examples entirely/monolithically) of a non-conductive material, and may contact the resonator 405 directly without separate insulating layers.

The legs 406 and 407 are each attached to an electrical control system 460. In the illustrated example, this electrical attachment is via respective wire leads 461 and 462. Via the leads 461 and 462, the electrical control system 460 applies a current along the path of the resonator 405 at the resonant frequency of the resonator 405 in the presence of a magnetic field apply by a magnet 465 disposed at the free end (i.e., the end opposite the constrained end at the support base 420) of the resonator 405. The magnet 465 may be for example, a rare earth magnet (e.g., a samarium-cobalt magnet) or other suitable magnet. Although wire leads 461 and 462 are utilized in the illustrated example, it should be understood that other mechanisms for producing a current (or sensing voltage, current etc.) may be provided. For example, induction may be utilized to generate the current, without having a direct electrical connection between the legs 406 and 407 and the control system 460.

The excitation current applied to the resonator 405 via leads 461 and 462 may be produced by any suitable mechanism. In some examples, the excitation current may be produced by a voltage-to-current convertor employing a high-current operational amplifier and connected to the output of a lock-in amplifier's internal function generator.

Figure 7:
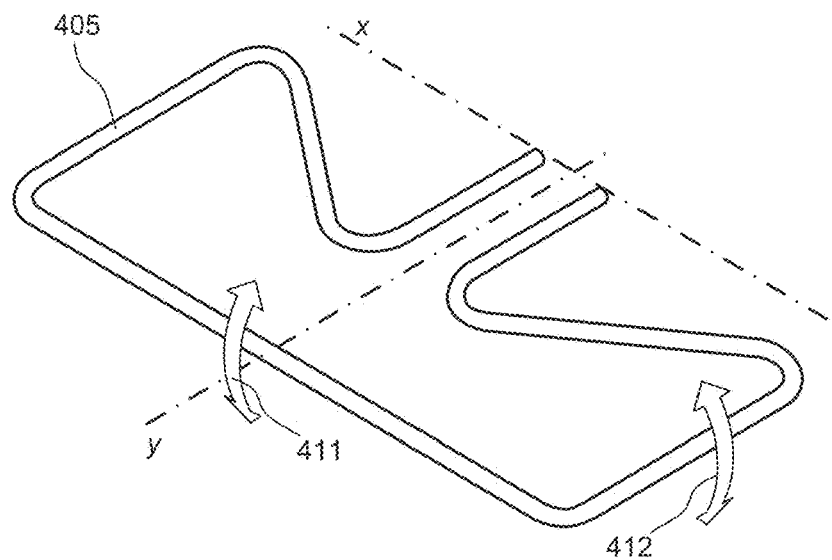
FIG. 7 shows the oscillating portion of the resonator tube of the flowmeter of FIG. 4 with arrows and axes to illustrate oscillation modes.
Figure 8:
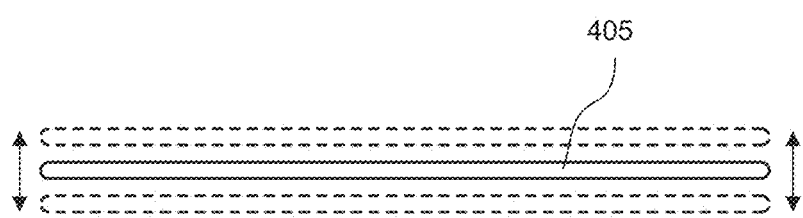
FIG. 8 shows the free end portion of the resonator tube during a primary oscillation mode.

Referring to FIG. 7, in response to the excitation current applied to the conductive resonator 405 in the presence of the magnetic field, the resonator 405 oscillates about the axis x as schematically illustrated by the double-sided arrow 411. This may be referred to as the fundamental resonance mode, or the "primary" resonance mode. FIG. 8 shows the free, or unconstrained, end of the resonator 405 along a view path that is parallel to the legs 406 and 407 during this primary mode of oscillation. The magnitude of the oscillation shown in the figures is not to scale and exaggerated for illustration purposes.

Figure 9:
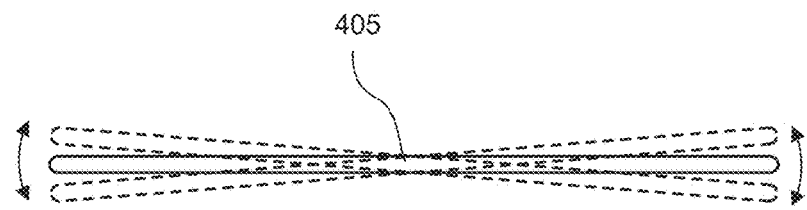
FIG. 9 shows the free end portion of the resonator tube during a secondary oscillation mode.

During the primary oscillation mode, a torsional oscillation mode, or "secondary" oscillation mode, may occur due to the flow of fluid within the internal flow path of the resonator 405. This secondary oscillation occurs about the axis y in FIG. 7 and schematically shown by double-sided arrow 412. FIG. 9 shows the free, or unconstrained, end of the resonator 405 along a view path that is parallel to the legs 406 and 407 during this secondary mode of oscillation. Although the secondary mode is shown in isolation in FIG. 9, it should be understood that during operation, the second mode is superimposed with the primary mode of oscillation (i.e., the secondary mode, when present, occurs simultaneously with the primary mode).

Although the illustrated example drives the fundamental mode with the excitation current and measures the secondary mode, in some examples, the secondary oscillation is driven with an excitation current, and the fundamental mode is measured to detect the mass flow rate.

In the illustrated example, the oscillations of the resonator 405 are detected by optical detectors 470 that each include a light emitter 475 and a light detector 480, both of which are mounted to a support 471 that is coupled to the substrate 450 shown in FIG. 4. In this example, the light emitter 475 includes a housing 476 having an aperture 477, and the light detector 480 includes a housing 481 having an aperture 482. The light emitter 475 further includes a light emitting diode disposed within the housing 476, and the light detector 480 includes a phototransistor disposed within the housing 481. Since the apertures 477 and 482 are aligned, when the light emitting diode is powered on (e.g., via the electrical control system 460), the light is narrowly focused by the aperture 477 of the light emitter 475 to and through the aperture 482 of the light detector 480 where it is received and detected by the phototransistor, which sends a corresponding signal to the control system 460. The path of the light is schematically illustrated by broken line 485 in FIG. 9. In the illustrated example, the detectors 470 communicate with the control system 460 via electrical wires 463 and 464. It should understood, however, that any suitable communication mechanism may be provided.

Figure 11:
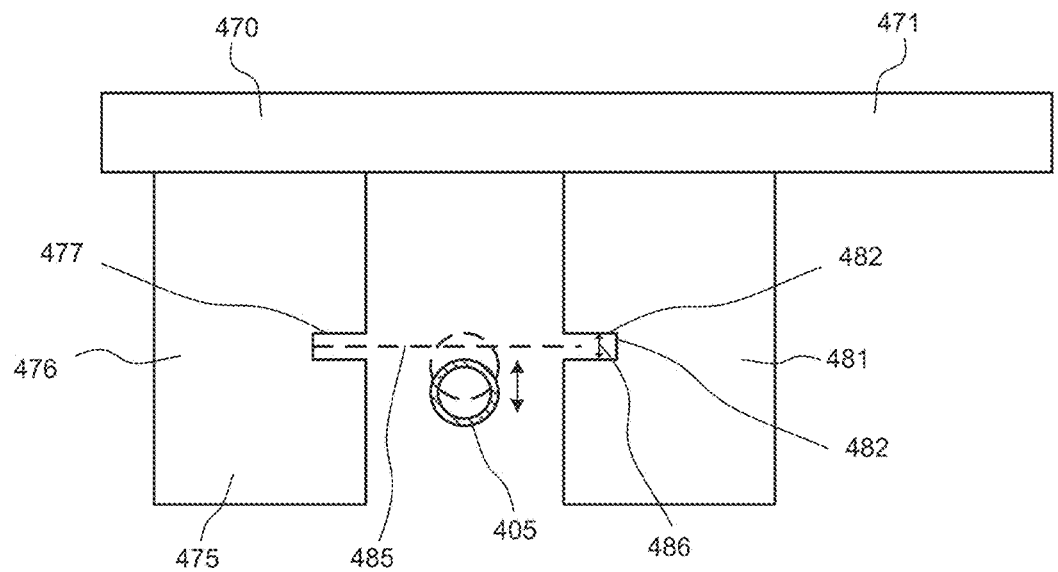
FIG. 11 shows an optical detector and a cross section of the resonator tube in a first position.
Figure 12:
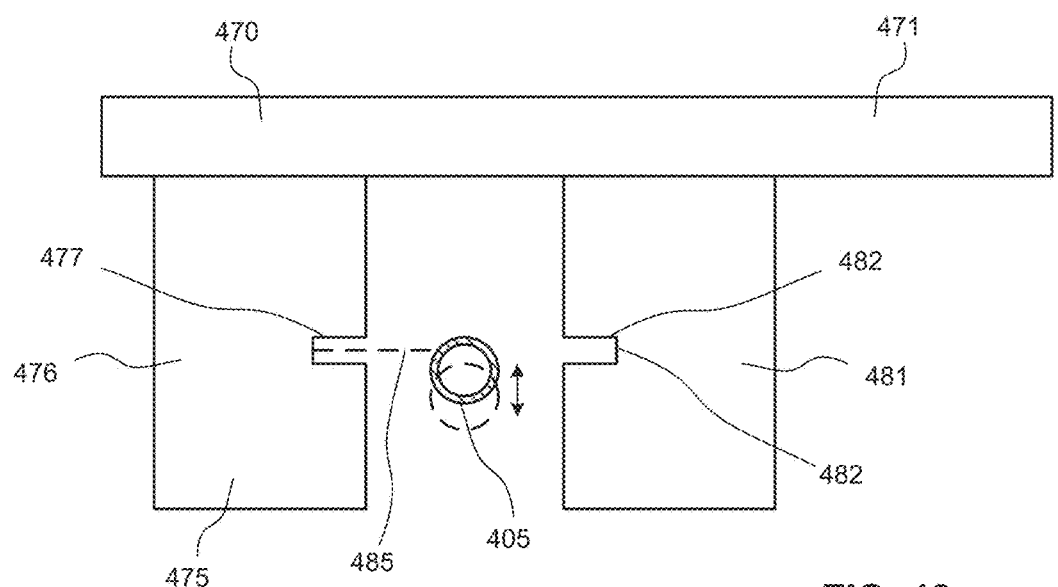
FIG. 12 shows the optical detector and cross section of the resonator tube in a second position.

Referring to FIGS. 11 and 12, during oscillation, the portion of the resonator 405 disposed between the emitter 475 and the detector 480 moves back-and-forth between the position shown in FIG. 11 and the position shown in FIG. 12 (each figure showing the respective other position with a broken-line circle). When the resonator 405 is not oscillating, its rest position falls at a location between that shown in FIG. 11 and that shown in FIG. 12.

Figure 10:
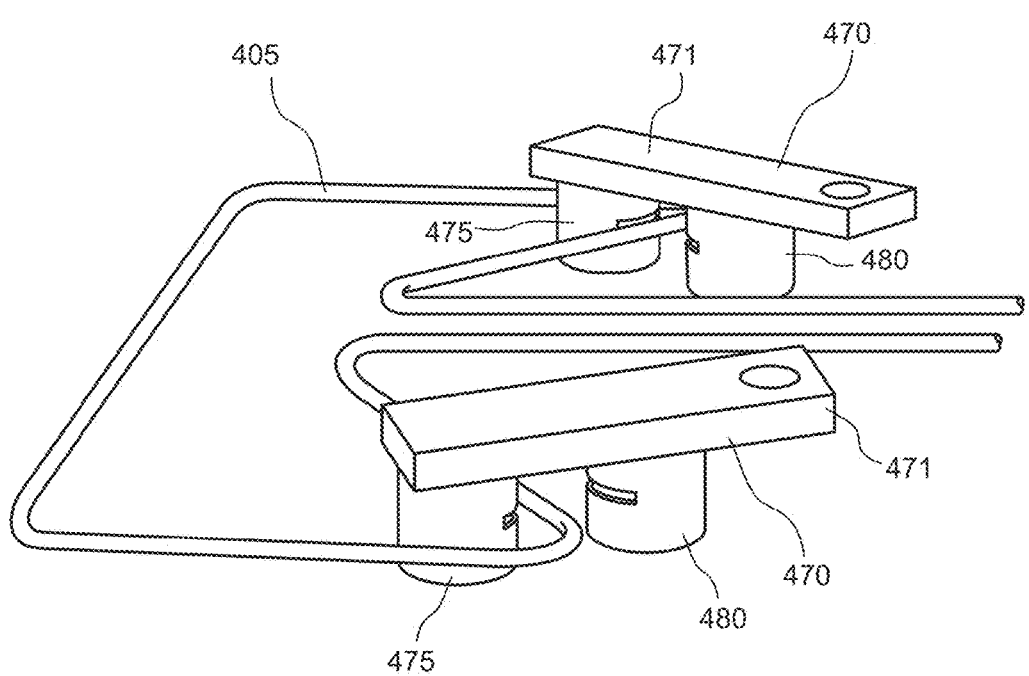
FIG. 10 shows the resonator tube with optical detectors of the flowmeter of FIG. 4.

Referring to FIG. 11 when the resonator 405 is in the lower position, the light has a clear path 485 to pass from the emitter 475 into the detector 480. However, as the resonator 405 moves to the position shown in FIG. 10, the resonator 405 moves into the light path 485 to prevent, or substantially impede, the light from reaching the detector 485. In this manner, the detector 485 generates a signal that reflects the oscillation of the resonator 405.

By having the apertures 477 and 482 at a narrow width 486 (e.g., on the order of 0.5 mm), the transmitted light beam is substantially narrowed. This allows for the detection system to have increased sensitivity, allowing for oscillations of relatively small magnitude to be detected.

At resonance, the tube amplitude detected by the optical detectors lags behind that of the excitation amplitude by $\pi/2$ as dictated by the physics of a simple harmonic oscillation. The Coriolis effect associated with mass flow through the resonator 405 induces the low amplitude torsional mode resonance. This twisting action is then detected as an additional small phase shift $\varepsilon$, where one of the two detectors 470 reports a phase shift of $\pi/2+\varepsilon$, and the other $\pi/2-\varepsilon$, with respect to the excitation. In some examples, the output of each optical interrupter may be connected to the input of a lock-in amplifier to measure the phase of the detected signal with respect to the excitation signal. In some examples, both the fundamental/primary and the torsional/secondary modes may be detected during a frequency scan. The phases may be observed and/or recorded at any suitable interval. Although the detectors 470 are disposed at particular locations in the illustrated example, it should be understood that they may be provided at any suitable location. Moreover, even though the illustrated example utilizes optical sensors, it should be understood that other examples may use additional or alternative sensor types to measure the oscillation of the resonator 405. For example, proximity detectors may be provided.

In the illustrated examples, the volume within the oscillating portion of the resonator 405 is microfluidic. In some examples, the volume is less than 50 microliters. In some examples, the volume is less than 30 microliters. In some examples, the volume is less than 15 microliters. It should be understood, however, that such examples are non-limiting and other examples, my provide volumes outside of these ranges.

The flowmeters described herein may also be calibrated to function as densitometers.

Figure 13:
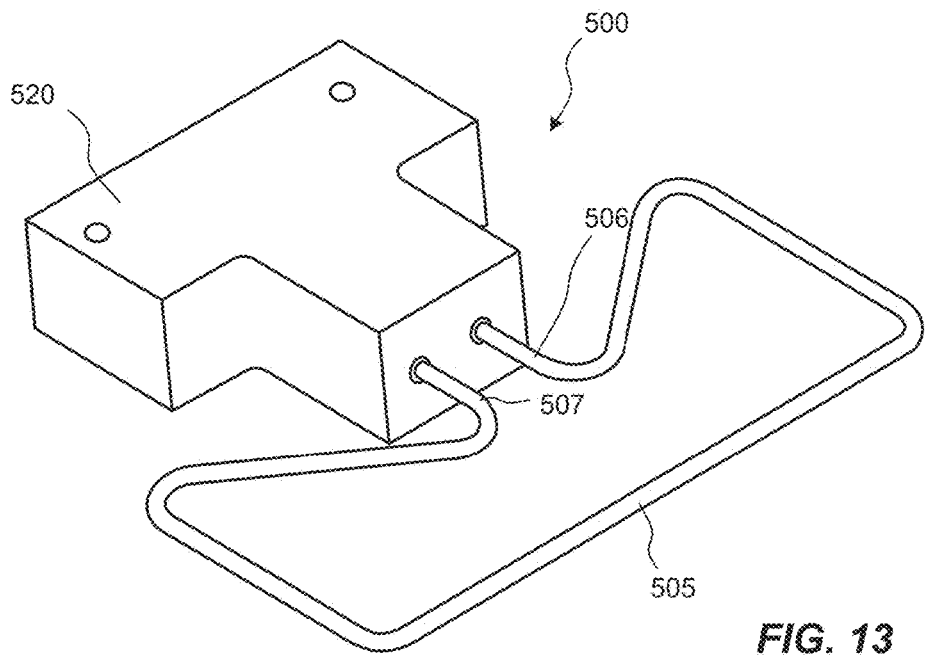
FIG. 13 shows a mass flowmeter.
Figure 14:
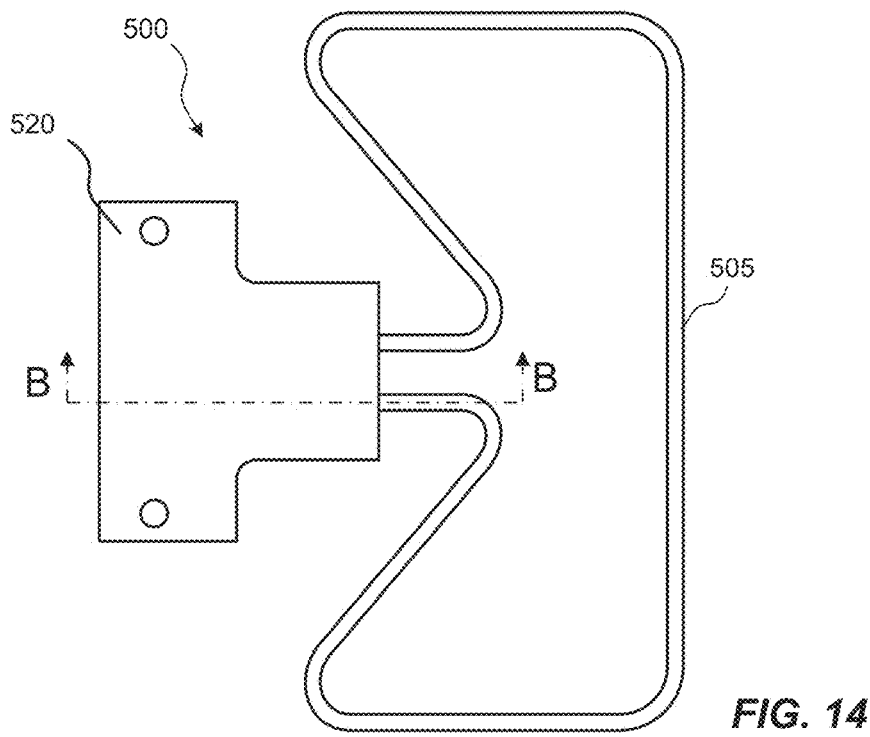
FIG. 14 shows a top view of the flowmeter of FIG. 13.

FIG. 13 shows a Coriolis-effect flowmeter assembly 500 with integrated electrical isolation components. Except to the extent described otherwise, the flowmeter 500 includes the same features, and functions in the same general manner, as the flowmeter 400. For simplicity of illustration, a substrate (e.g., substrate 450 as described above), detectors (e.g., optical detectors 470 as described above), and an electrical control system (e.g., electrical control system 460 as described above) are not visible in FIG. 13. In this example, the proximal end of resonator 505 is supported by a base block, or support base, 520, leaving the remaining portion of the resonator 505 cantilevered to allow for the oscillations utilized in the operation of the flowmeter 500, analogous to the operation of flowmeter 400 described above. FIG. 14 shows a top view of the flowmeter assembly 500.

The proximal portion of the tubular resonator 505, which includes two open tube ends corresponding to the two respective legs 506 and 507 of the resonator 505, is hermetically sealed with respect to the body block 520 to prevent sample fluids from leaking as they flow into and out of the resonator 505.

Figure 15:
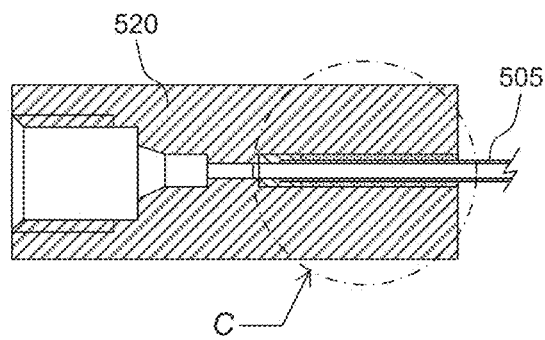
FIG. 15 shows a cross sectional view corresponding to section B-B of FIG. 14.
Figure 16:
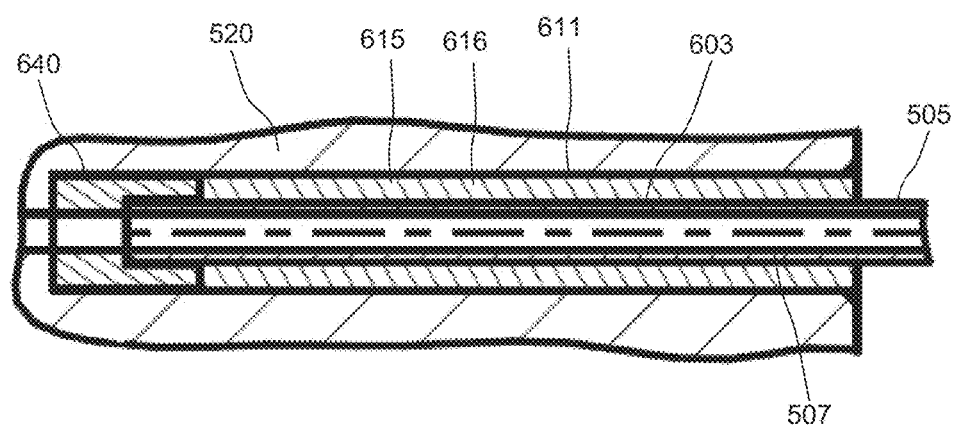
FIG. 16 shows a sectional view corresponding to section C of FIG. 15.

Referring to the cross-sectional views of FIGS. 15 and 16, an electrical insulator 615 couples the proximal end of each of the two legs of the resonator 505 to the body block 520. This coupling 615 mechanically supports the resonator 505 (via engagement with legs 506 and 507) and simultaneously provides electrical insulation to prevent electrical currents from passing from the body block 520 or other portion of the flowmeter to the resonator 505 and vice-versa, thereby electrically isolating the resonator 505 from the body block 520. This prevents electrical noise present in components such as conductive fluid delivery tubes and the body block 520 from interfering with the electrical signals utilized with the resonator 505 during actuation and/or measurements.

As illustrated in FIG. 16, the electrical insulator 615 extends along the proximal end portion of the leg of the resonator 505. The electrical insulator 615 is formed of glass. In some examples, the electrical insulator 615 is formed by glass frit bonding using doped glass powder. The doped glass powder has a low melting temperature (e.g., less than 450° C.) that will allow the doped glass powder to melt while avoiding melting of the body block 2010. Such powders may be obtained commercial from, for example, Asahi Glass Co., LTD of Tokyo, Japan (http://www.agc-.com).

Although in some examples, the electrical insulator 615 is a single monolithic component, the electrical insulator 615 shown in FIGS. 15 and 16 is formed of two components. In particular, the insulator 615 is formed of a doped glass body 616 and a base body 640. It should be understood that the features corresponding to a cross section through the leg 506 are the same as the features described in connection with the cross section through the leg 507 illustrated in FIGS. 15 and 16, although in other examples, the features may differ between the two sides.

The doped glass powder is formed into a near-shape glass bead by compression molding. This near-shape bead is then placed in the position in the block 520 where it is to provide an electrically insulative hermetic seal. In the illustrated example, the doped glass bead is placed into a channel 611 in the block 520 and corresponds to the general shape and position as the insulator 615. After the bead is placed in the channel 611, the resonator 505 is inserted into the channel 611 and into the bead. The structure is then heated to the melting point of the doped glass bead. During the heating and subsequent cooling, the doped glass will bond to the metal and became solid, thereby securing the resonator 505 in place relative to the block 520.

Referring to the example of FIG. 16, when the doped glass is in a liquid or non-rigid state during the melting process, the resonator 505 is maintained in its position spaced apart from the annular channel wall 611 by the base bodies 640 which function as jigs, receiving the respective ends of the legs 506 and 507. The base bodies 640 in the illustrated example are formed of an electrically insulative material (e.g., glass or ceramic) that has a melting temperature substantially higher than the melting temperature of the doped glass utilized to form the doped glass body 616. As such, when the densitometer module 2000 is heated to melt the doped glass to form the insulator doped glass body 616, the base bodies 640 remain solid, thereby retaining adequate structure to maintain the insulator doped glass body in its position spaced apart from the channel 611 of the block 520 until the doped glass has cooled and solidified to produce the hermetically sealed solid insulator structure 615. The base body 640 may also be utilized to block potential flow of the melted doped glass during the heating process.

Figure 17:
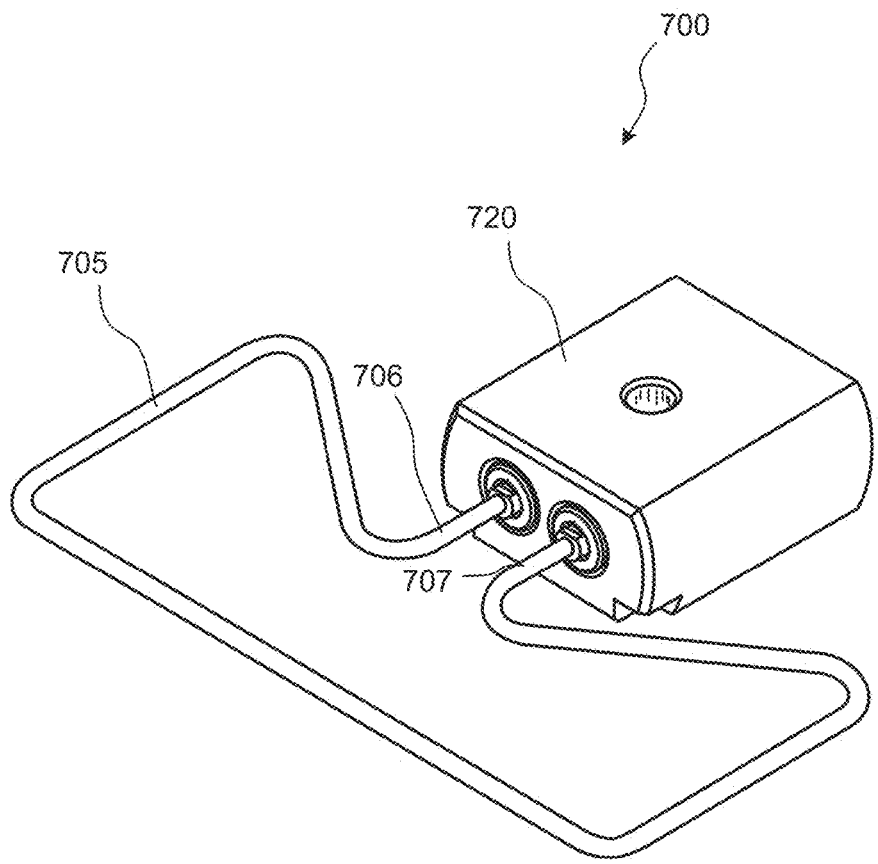
FIG. 17 shows a mass flowmeter.

FIG. 17 shows a flowmeter assembly 700 that is analogous to the flowmeter assembly 500 except to the extent described otherwise.

The flowmeter assembly 700 differs in the structure of the base block 720 and the insulator structure. Referring to the exploded view of FIG. 20 and the cross-sectional views of FIGS. 18 and 19, the channel 811 has an enlarged section 812 with a diameter that is larger than the remainder of the channel 811. This enlarged section 812 receives a corresponding enlarged portion 817 of the doped glass body 816.

Further, in addition to the base body 840 and the doped glass body 816, the electrically insulating coupling 3015 further includes a cap body 845, which functions as a second jig disposed at the end of the doped glass body 816 opposite the base body 840. This two-jig configuration—i.e., the base body 840 and the cap body 845—serve to stably support the leg 706 of the resonator 705 during the melting of the doped glass, and may also be utilized to resist flow of the liquefied or non-solid doped glass from its intended position during the heating process.

In the illustrated example, the cap body 845 further receives and supports a mass block 848, which is coupled to the respective leg of the resonator 705. The mass block 848 may be secured to the leg via the adhesion of the doped glass of the doped glass body 816 and/or any other suitable coupling mechanism. In some examples, the mass block 848 is present to provide additional vibrational isolation of the resonator 705 to improve performance during operation of the resonator 705 to measure flow properties, for example.

In some examples, the presence of the mass block 848, in addition to the rigid connection of the mass block 848 to the resonator 705, causes a standing wave node location at the location of the mass block 848 during the oscillation of the resonator 705. In this regard, the mass of the block 848 coupled with the fact that its location corresponds to the vibrational node allows for electrical connections be made without altering the vibrational/resonant properties of the resonator 705. For example, the electrical connections may be made directly to the electrically conductive mass blocks 848. Since the mass blocks 848 are electrically coupled to the vibrating tube element 3002, applying the electrical leads to the mass blocks 848 provides a mechanism to apply the excitation current (and/or measure vibrational response in some examples) without having the physical electrical connection adversely impact the performance of the device. In particular, for example, this structure allows for connecting the electrical leads without altering the resonance of the resonator tube 705.

As with the base bodies 640 described above, the base bodies 840 and the cap bodies 845 in the illustrated example are formed of an electrically insulative material (e.g., glass or ceramic) that has a melting temperature substantially higher than the melting temperature of the doped glass utilized to form the doped glass body 816. As such, when the densitometer 3000 is heated to melt the doped glass to form the doped glass body 816, the cap bodies 845 remain solid, thereby retaining adequate structure to maintain the insulator 815 in its position spaced apart from the channel 811 of the block 720 until the doped glass has cooled and solidified to produce the hermetically sealed solid insulator structure 815. It should be understood that the various instances of the base bodies 640, 840 and cap bodies 845 in any given example may be formed of the same or different materials relative to each other.

Figure 18:
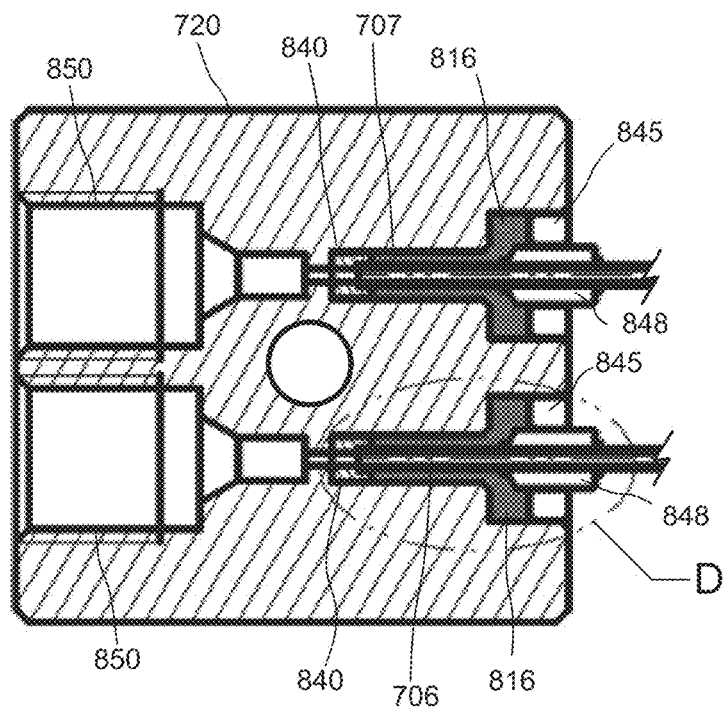
FIG. 18 shows a partial cross-sectional view of the flowmeter of FIG. 17.

Referring to FIG. 18, the block 720 includes a pair of receptacles 850 to receive respective high-pressure sealed tube fittings to couple a metal flowline to the flowmeter assembly 700 in order to deliver sample fluids into the resonator tube 705 (via one of the two legs 706, 707) and away from resonator tube 705 (via the other of the two legs 706, 707) in order to allow analysis of the sample fluid and/or the flow thereof. Because of the insulating coupling 815, any electrical noise that may be present in the flowline or other conductive structures is isolated from the resonator 705 to prevent such noise from interfering with the operation (e.g., actuation and/or detection) of the flowmeter. At the same time, the insulating coupling 815 maintains a hermetic seal between the flowline and the resonator 705 under operating conditions of the densitometer. The same features apply with regard to the insulating coupling 615.

Although various fasteners and locating devices may be described or herein or shown in the figures, it should be understood that any suitable assembly and/or manufacturing methods may be employed, and the present disclosure is in no way limited to the specific examples shown and described.

The resonator tubing 405, 505, 705 may have an outer diameter of 1 mm or less in some non-limiting examples. The resonator tubing 405, 505, 705 may be made of stainless steel, Hastelloy, medical grade tubing, or any other suitable material. In some examples, the tubing 405, 505, 705 and/or other metallic components may be made of spring metal such as SPRON, developed by Seiko Instruments Inc. In some examples, the tubing 405, 505, 705 is glass tubing coated with a conducting metal.

Figure 19:
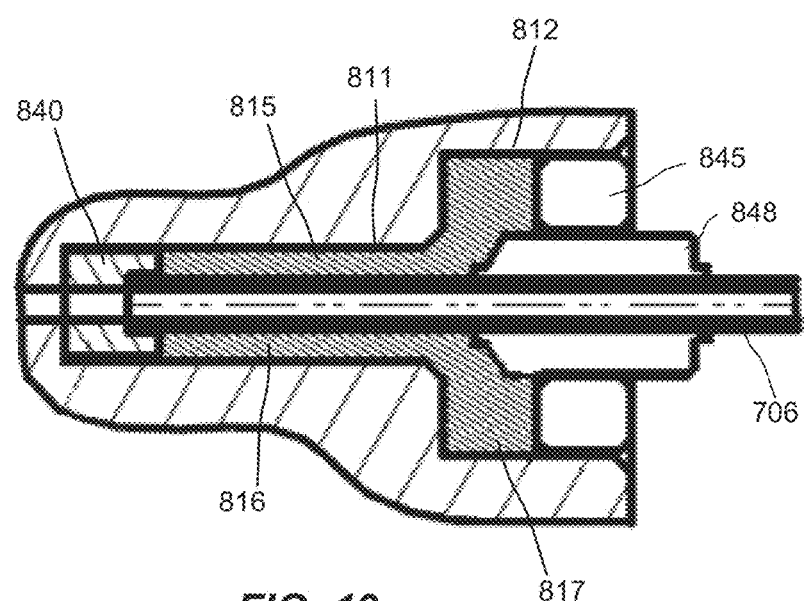
FIG. 19 shows a sectional view corresponding to section D of FIG. 18.
Figure 20:
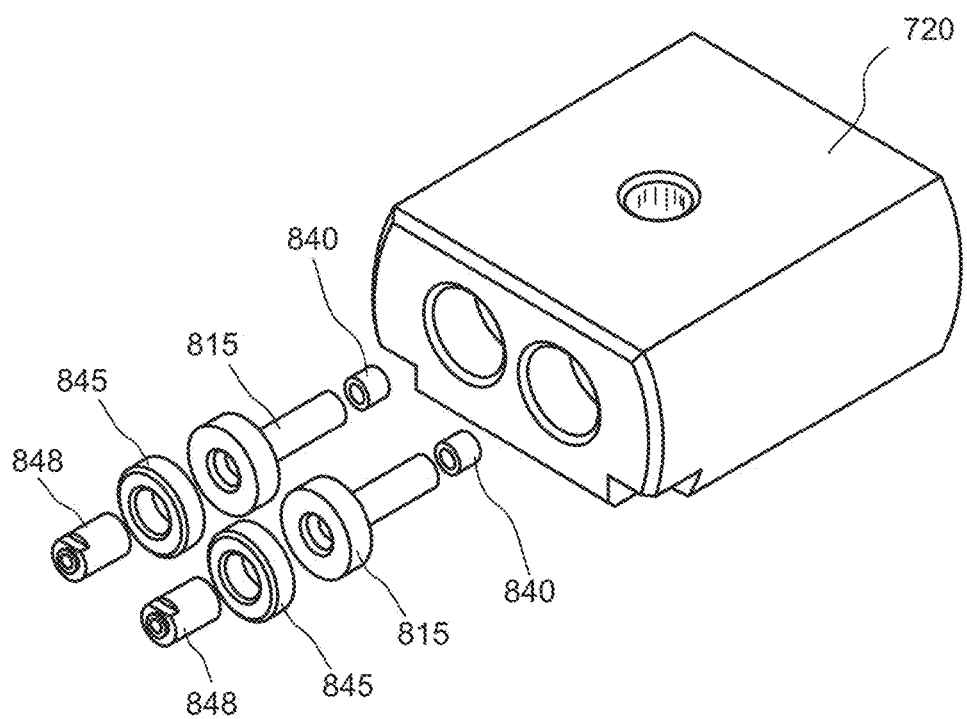
FIG. 20 shows an exploded view of the base portion of the flowmeter of FIG. 17.

The electrical isolation structures illustrated, for example, in FIGS. 16 and 19 function to fluidically and hydraulically connect the metal tubes 505 and 705 while maintaining electrical isolation of the tubes 505 and 705 with respect to the inlet tubes and other conductive structures external to the tubes 505 and 705.

In some examples, the support base or block 420, 520, 720 is metal (e.g., aluminum or stainless steel), although the support base/block may be formed of any other suitable material.

Example embodiments of the mass flowmeters described herein are operable to high pressures up to 15,000 psi or more and high temperatures up to 150° C. or more for determining measurements in a tube having an outer diameter approximate $\frac{1}{32}$" along with a fluid sampling volume of less than 20 microliters. It is noted that temperatures in some oilfield applications may reach 150° C. (it is noted the temperatures could be as high as 350° C.) along with pressures of 15,000 psi (it is also noted the pressures could be as high as 35,000 psi). Further, the diameter of the tube can be greater or less and the fluid sampling volume may be up to, for example, 1000 micro-liters. Further still, the resonator tubes described herein, by non-limiting example, may be made of stainless steel or other related materials having similar properties. However, other types of metals may be used (for example, titanium, nickel and related alloys). It is further noted that the above-described glass insulator configurations are also able to withstand the aforementioned pressure and temperature conditions, such as may be found, for example, downhole during open-hole operations.

The body block 420, 520, 720 may be secured in the downhole housing by any suitable fastening mechanism (e.g., screws, adhesive, soldering, welding, brazing, etc.) and in some examples electrically isolated from the downhole housing.

A typical high pressure fluidic system connects a metal flowline to the electrical ground plane, thereby introducing stray voltages and currents, which can alter the operation (e.g., actuation and/or detection) of the flowmeter. Thus, the glass insulators 615, 815 are provided to electrically isolate the two coupled tubes, along with being capable of operating in high shock and high temperature device conditions. In contrast with some other potential solutions, the electrical isolation structure of, e.g., FIGS. 16 and 19 provide electrical isolation without adding an unacceptable amount of dead volume. Since these sensors are considered to be microfluidic, the addition of a significant amount of dead volume (e.g. greater than a few, e.g., 3, microliters) would render the sensor inoperable in some intended microfluidic applications, or would require greater flushing volume.

Figure 21:
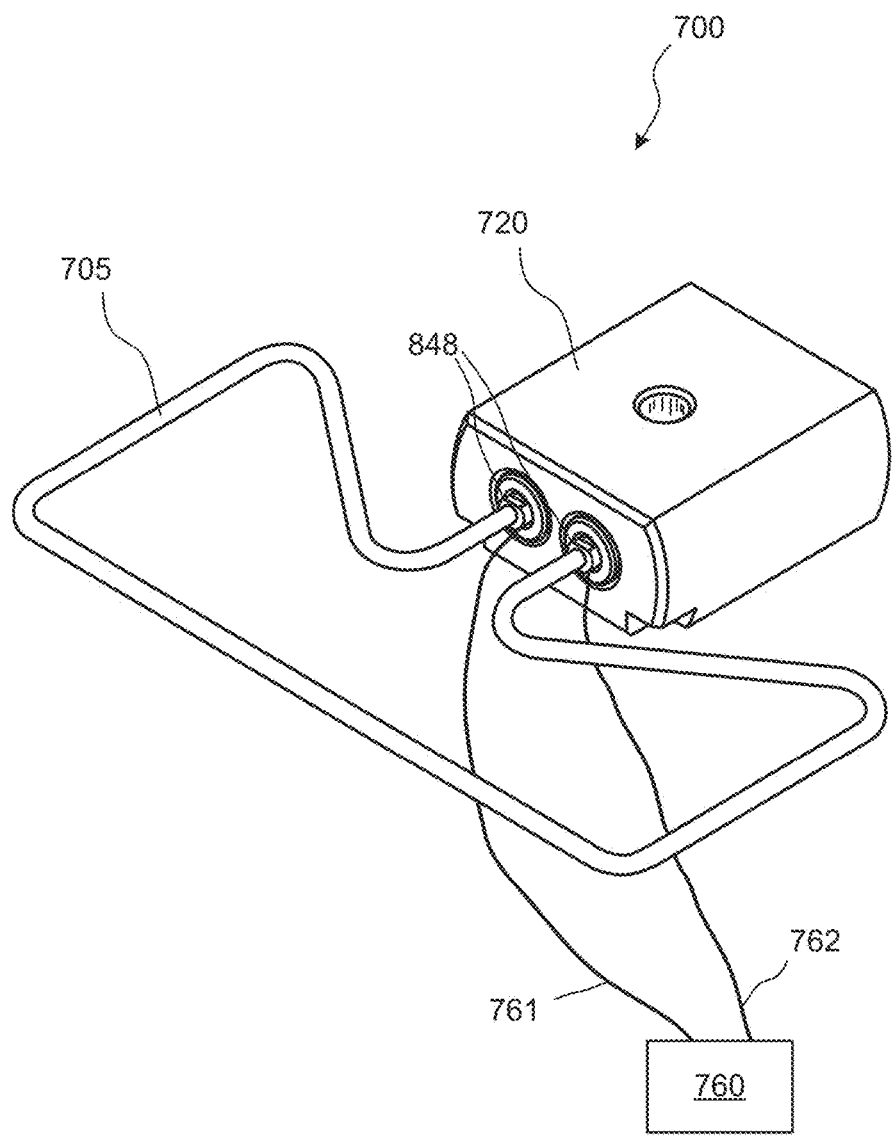
FIG. 21 shows the mass flowmeter of FIG. 17 with an electrical control system attached.

Electrical connections to the resonator 705 may be provided in the form of, referring to FIG. 21, electrical leads/wires 761 and 762, which may be soldered or otherwise attached to be in electrical communication with the respective legs of the resonator 705. As indicated above, the connection of the electrical leads 761 and 762 at the respective mass blocks 848 in the illustrated example allows for an electrical connection that does not mechanically affect the vibrational properties of the resonator 705 by, for example, altering the relevant resonance frequency of the resonator 705 in the absence of such connection.

An electrical control system 850, the same or analogous to the electrical control system 460 described above, is connected to the electrical connections 761 and 762 to provide the voltage and current across the corresponding legs of the resonator 705 to induce the aforementioned resonant oscillations.

It is further noted that in addition to the vibration/oscillation, the control systems 460, 760 of the illustrated examples may factor in temperature and pressure in determining the properties of the sample fluid in the and/or flow of the fluid.

Additional details of the operation of the densitometer configurations 2000 and 3500 may be found in U.S. Patent Application Publication No. 2010/0268469, which is incorporated herein by reference in its entirety and provides an analogous densitometer structure and function, but without, for example, the glass isolator configuration of the present application.

Example

Figure 22:
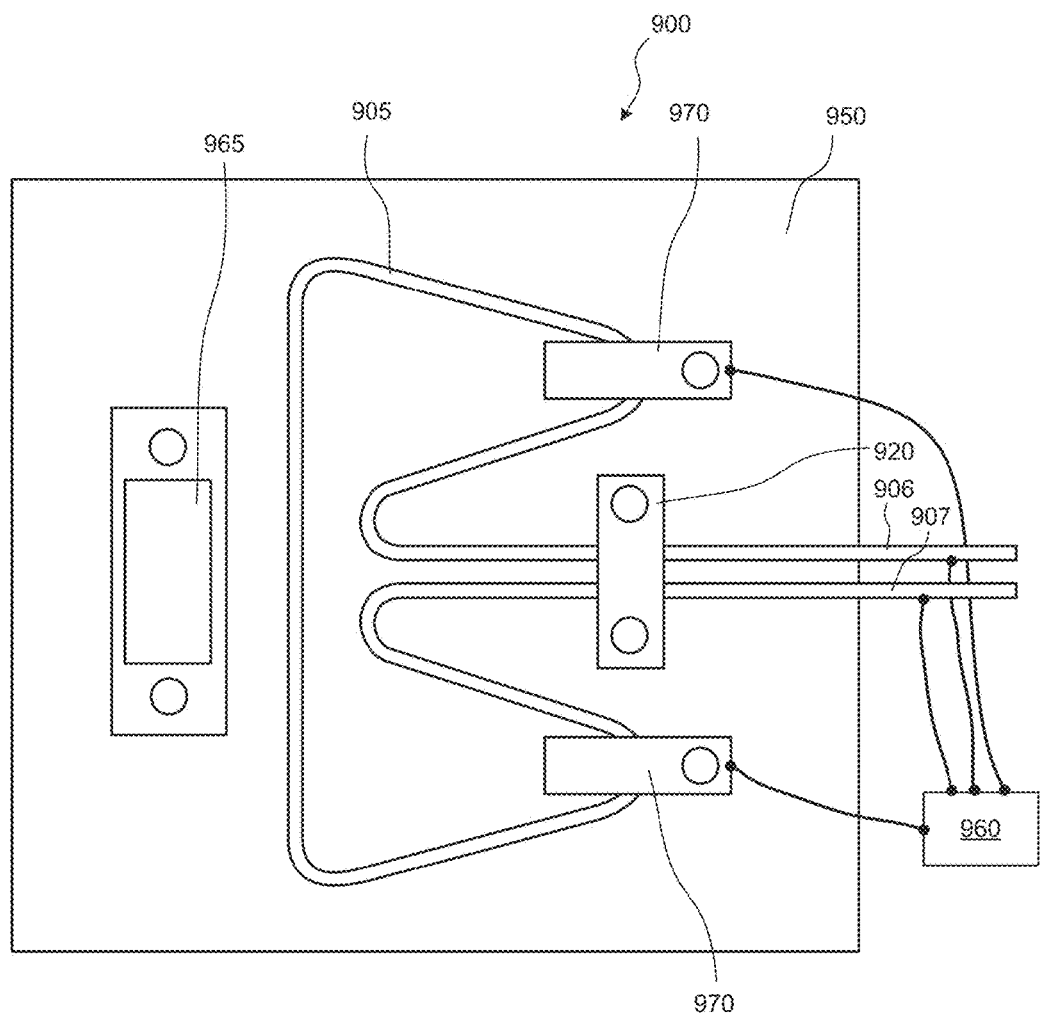
FIG. 22 shows a mass flowmeter.

An example device was prepared in accordance with the schematic illustration of flowmeter 900 in FIG. 22. The device of FIG. 22 includes a substrate 950, resonator 905, support block 920, detectors 970, and an electronic control system 960, which is coupled to the detectors 970 and legs 906 and 907 of the resonator 905. The components of the flowmeter 900 includes the same features set forth above with regard to flowmeter 400 and analogous manner. The flowmeter 900 differs, however, in the shape of the resonator 905. In comparison to the resonator 405, the resonator 905 has outer edges that are not parallel. In particular, the outermost lateral sections are flared inwardly as they extend from the free or distal end of the resonator 905 toward the respective detectors 970.

The fluidic volume of the resonator was slightly less than 15 microliters. Electrical connections to the tubing were made with alligator clips. The sensor was actuated by passing current through the tube itself at the resonant frequency in the presence of the magnetic field, the latter provided by a SmCo magnet placed at the end of the sensor as schematically illustrated as magnet 465 in FIG. 4. Excitation current was produced by a voltage-to-current convertor employing a Burr-Brown OPA549 high current operational amplifier and was connected to the output of a lock-in amplifier's internal function generator (Stanford Research Systems SR850).

Two Omron optical interrupters (model EE-SX1096W1), corresponding to the detectors 470 in FIG. 4 or detectors 970 in FIG. 22, were used to detect the oscillatory motion of the two sensor arms (the two lateral sides or "wings" of the resonator). The Light Emitting Diode (LED; corresponding to light emitter 475 in FIG. 10) and phototransistor (corresponding to light detector 480 in FIG. 10) acted as an emitter and detector pair and were extracted and glued into aluminum supports illustrated as housings 476 and 481 in FIGS. 11 and 12, thereby allowing an increased distance between the emitter and detector. Metal apertures (illustrated as apertures 477 and 482 in FIGS. 11 and 12) with 0.5 mm openings (illustrated as aperture width 486 in FIG. 11) were manufactured that maintained the high sensitivity of the interrupters while allowing for a greater range of entry and exit angles for the tubing (corresponding to illustrated resonator 405)). The LED was driven by a 3 volt source in series with a 1,000 Ohm resistor. The phototransistor was driven by a 10 volt source applied to the collector and a 25,000 Ohm resistor was connected between the emitter and ground. Light impinging on the phototransistor increased the current and the resulting voltage across the resistor was connected to the input of the lock-in amplifier. As the SR850 can measure only one voltage when not operating in differential mode, two lockins (synchronized together) were employed so that each optical interrupter could be measured independently and absolutely.

Figure 23:
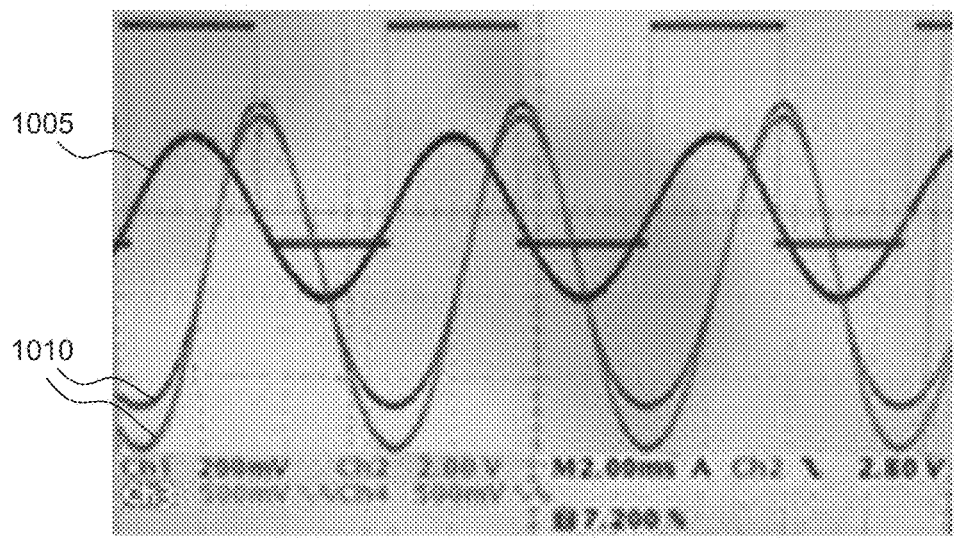
FIG. 23 shows an oscilloscope image.

The fundamental resonance mode (see FIG. 8 and arrow 411 of FIG. 7) of the bent-tube resonator is similar to the motion of a diving board, corresponding to an up-and-down motion of the tube normal to its plane. At resonance, the tube amplitude detected by the optical interrupters lags behind that of the excitation by $\pi/2$, as would be expected for a damped harmonic oscillator. The Coriolis effect associated with mass flow through the resonator tubing induces a low amplitude torsional mode resonance (See FIG. 9 and arrow 412 of FIG. 7). This twisting action is then detected as an additional small phase shift $\varepsilon$, where one interrupter reports a phase shift of $\pi/2+\varepsilon$, and the other $\pi/2-\varepsilon$, with respect to the excitation. The output of each optical interrupter is connected to the input of a lock-in amplifier which measured the phase of the signal with respect to the excitation (FIG. 23). In the oscilloscope image of FIG. 23, the signals 1010 from the optical detectors each lag behind the excitation signal 1005 by 90 degrees, as would be expected at resonance.

During calibration, excitation is maintained at the resonant frequency and the difference of these two signals ($2\varepsilon$) is monitored, thereby removing any spurious drifts in phase that could arise randomly in time but uniformly on both sensors. The phases of both optical interrupters were typically recorded once every two seconds. The location of the optical sensors at the locations indicated by detectors 970 in FIG. 22 is believed to provide the highest sensitivity to flowrate through experimentation.

Figure 25:
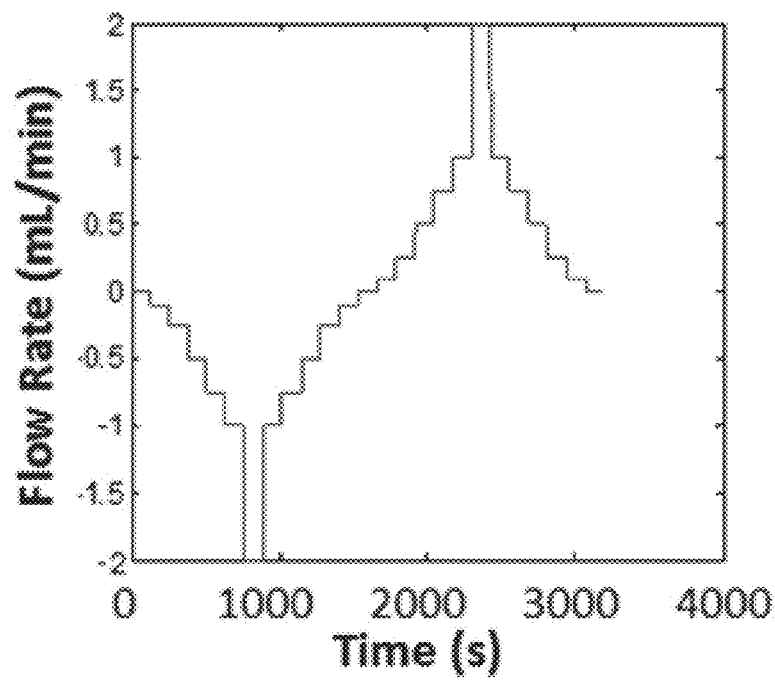
FIG. 25 shows volumetric flow rate of water vs time at 2000 psi.

The sensor was assembled on an aluminum breadboard and placed into a computer-controlled Sigma Systems oven. Benchmarking took place over the course of several days and analysis was performed after a first burn-in cycle. Controlled volumetric flow at well-defined pressures was created by two Isco 65D pumps with water, each being connected to one side of the flowmeter. After setting the first pump to the pressure of choice, the second pump would be set to the desired flow rate. Flow would be created by the response of the first pump to the flow rate of the second pump. To reverse the flow direction, the roles of the two pumps would be exchanged. During typical benchmarking, the flow rate was stepped from −2.0, −1.0, −0.75, −0.5, −0.25, −0.1, 0, 0.1, 0.25, 0.5, 0.75, 1.0, 2 mL/minute and back as shown in FIG. 25. At the pressures and temperatures used in this example, a milliliter of water can be well-approximated as a gram of mass; a flow rate of 1.0 mL/minute corresponds very closely to 1 gram/minute with a difference no greater than 0.005 g/minute, which may be considered an insignificant error in the context of the present example.

When operating as a flowmeter, the lockin-amplifier was controlled by a computer program to excite the sensor at the dominant resonant frequency. This was done by measuring the phase of one of the optical interrupters with respect to the excitation and maintaining its phase lag at 90 degrees (indicative of resonance) by raising or lowering excitation frequency of the lockin-amplifier accordingly. In practice this was found to be quite robust and enabled automated benchmarking to take place without intervention for weeks at a time, in spite of significant changes to the resonant frequency due to changes in temperature or fluid pressure.

Results

Resonant Frequencies

Figure 24:
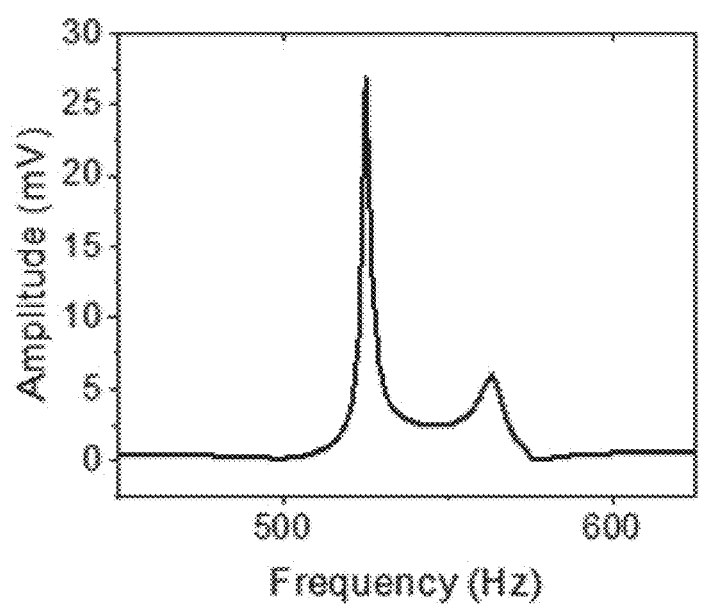
FIG. 24 shows a frequency scan of an optical detector when the mass flow is zero.

The design of the resonator is chosen to enhance the coupling of the fundamental and torsional modes. These two modes can most easily be observed with a frequency scan (FIG. 24) performed here with a SR850 lockin-amplifier where the output of only one optical interrupter is shown.

The high-amplitude fundamental mode is seen at 524 Hz and the low-amplitude torsional mode is seen at 575 Hz. No significant signal was observed at frequencies below 524 Hz, though higher resonances (higher order modes) could be seen several hundred Hertz above these two peaks. When excited at the lower frequency (fundamental), the two optical interrupters were observed to resonate in phase, but when excited at the higher frequency (torsional), the output of the two optical interrupters was observed to 180 degrees out of phase, consistent with expectations for the torsional mode. The phase shift between the excitation and optical interrupter progresses through a shift of $\pi$ radians as the frequency is swept through the fundamental resonance at 524 Hz, as is typical for a harmonic oscillator, though the signal is typically rendered more complicated to interpret due to the presence of multiple modes of small amplitude. The magnitude and sign of the phase depended on the exact position of the optical interrupters, so mechanical stability of the detectors was beneficial for obtaining repeatable calibrations.

The ratio of the resonant frequency of the two peaks could be tuned by the geometry of the resonator. The sensitivity of the flowmeter was generally found to be highest for those sensors with resonant peaks in close proximity and the design was tuned such that the difference of the two resonant frequencies was never greater than a few Hz.

Flow Rate: Single Pressure

Figure 26:
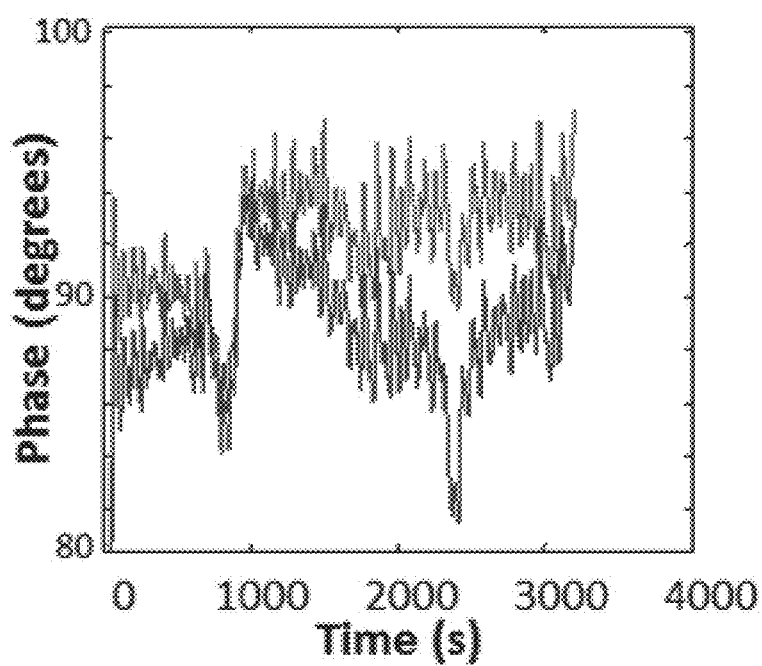
FIG. 26 shows individual phases measured by optical interrupters.
Figure 27:
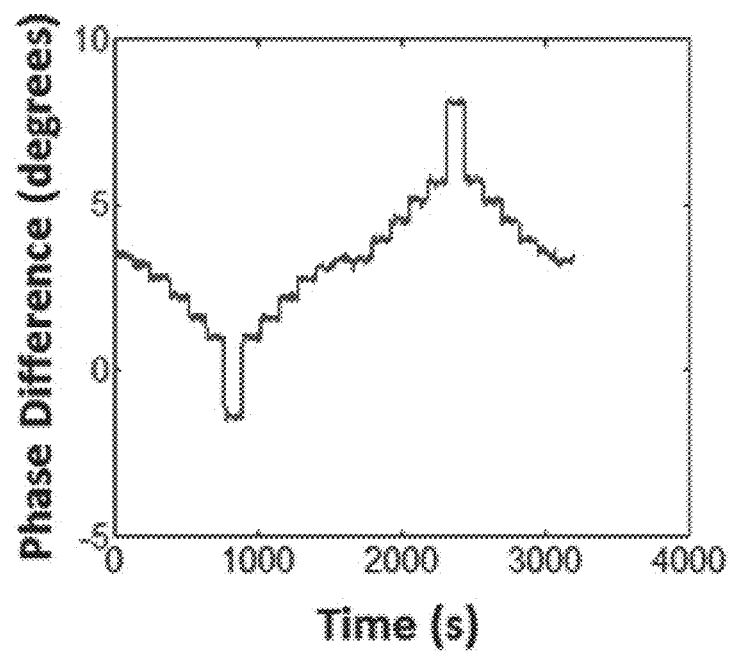
FIG. 27 shows difference in phases measured by the two optical sensors.
Figure 28:
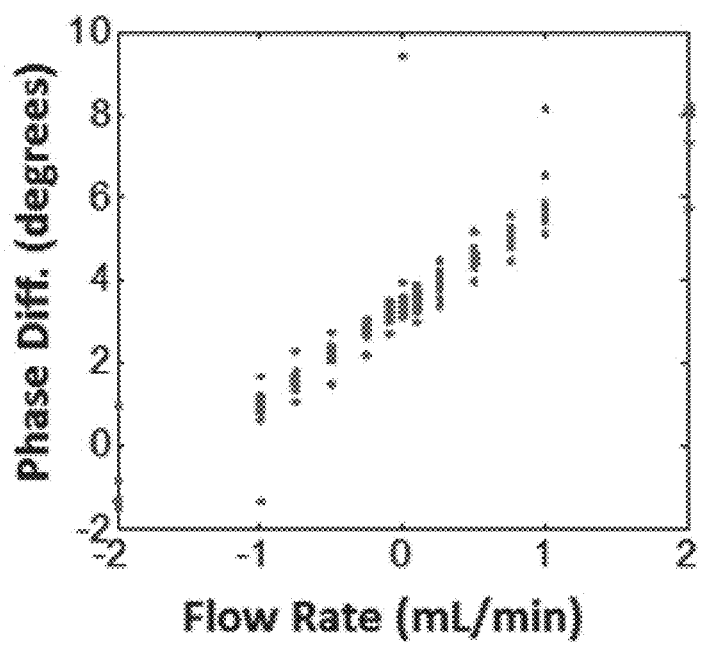
FIG. 28 shows phase difference vs. flow rate.

During benchmarking, the flow rate was varied from −2.0 to +2.0 ml/min with a computer program that passed commands to two Isco pumps via the serial port with a program written in Labwindows/CVI. In the example presented in FIGS. 25 to 28, the pressure was set at 2000 psi and the flow rate varied in a discrete and cyclic fashion (FIG. 25). The excitation frequency was maintained via computer-controlled feedback at the resonant frequency as described earlier. The phases measured by both optical interrupters (one per lock-in amplifier) are shown in FIG. 26, where both sinusoidal signals lag behind the excitation signal by approximately 90 degrees, as would be expected at resonance. A large amount of noise can be seen on the raw phase measurements. A pronounced separation can be seen at 2500 seconds during flow at +2.0 ml/min (2400 seconds), and an overlap of the phases at −2.0 ml/min (750 seconds). The time dependence of the difference of the two phases is plotted in FIG. 27, which resembles the flow rate in FIG. 25. The removal of noise in FIG. 26 by subtraction of the two sensor signals demonstrates that the noise measured at each signal is largely identical. Lastly, phase difference vs flow rate is plotted in FIG. 28, where a strongly linear relationship can be seen between the volumetric rate and the phase shift. The locus of the points at each flow rate illustrates the range in phase shifts measured. For this data, regression reveals that the slope is 2.4 degrees/(mL/min) with an offset at zero flow of +3.4 degrees. The offset was found in this example to be strongly dependent on the position of the optical interrupter with respect to the tubing and can be varied or nulled by proper placement.

Flow Rate: Multiple Pressures and Temperatures

Figure 29:
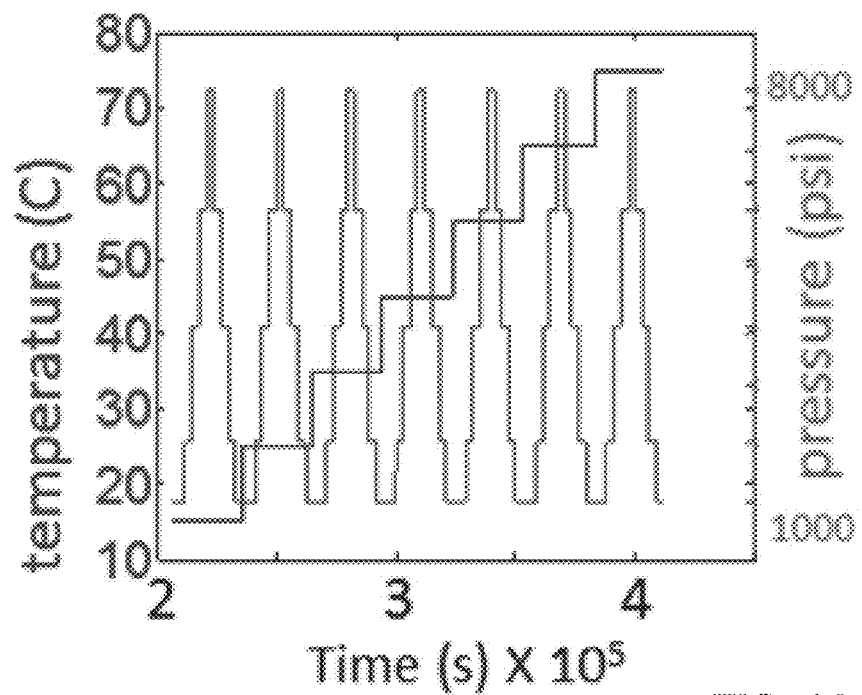
FIG. 29 shows pressure and temperature steps where benchmarking is effected for each step.
Figure 30:
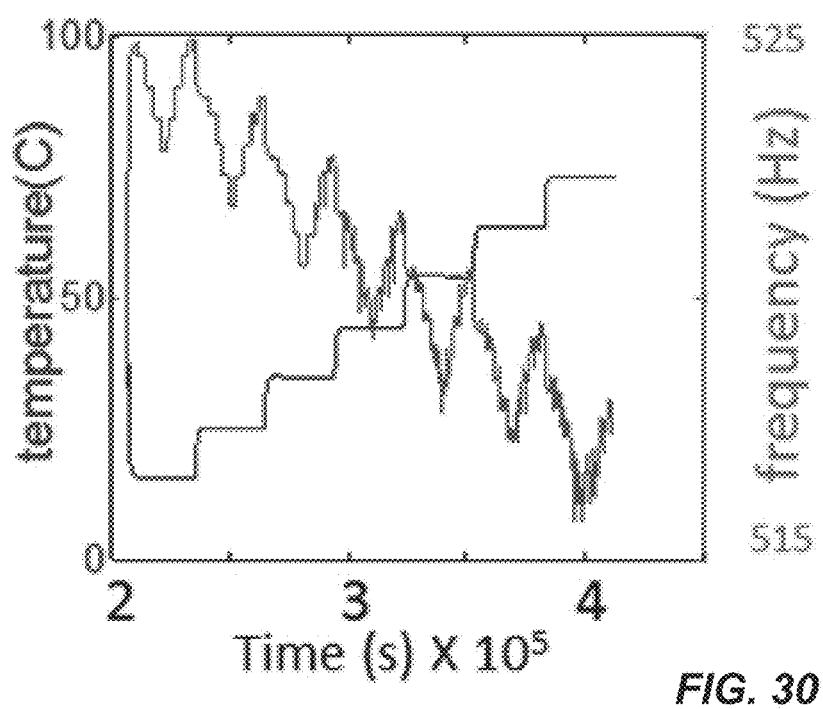
FIG. 30 shows frequency vs. time for the data of FIG. 29.
Figure 31:
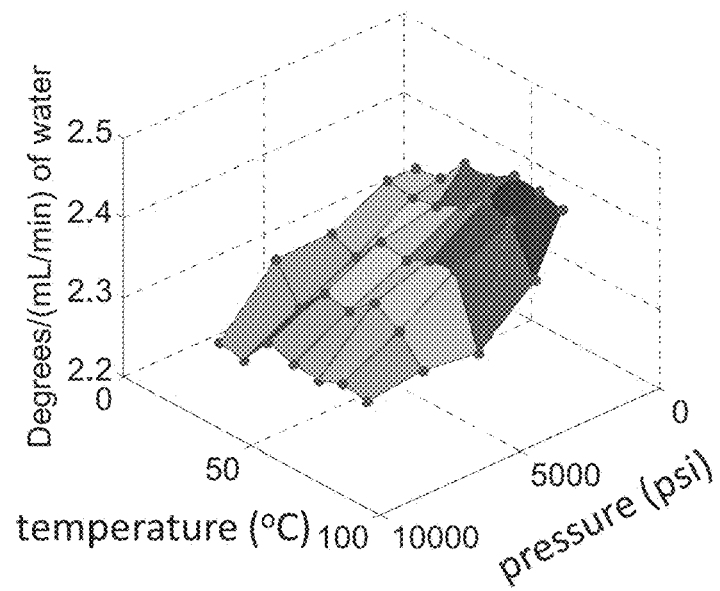
FIG. 31 shows a plot of flowrate sensitivity vs. temperature and pressure where reported volume of milliliters is the volume of water at the pressure of interest.
Figure 32:
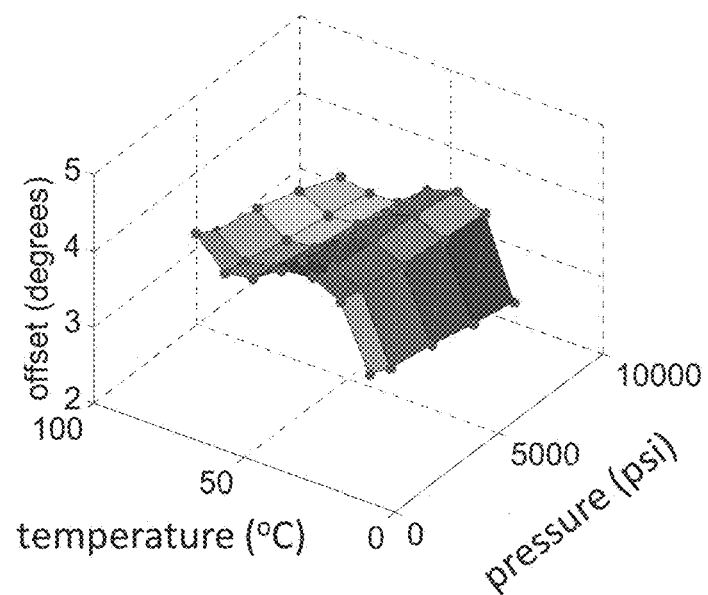
FIG. 32 show a plot of offset vs. temperature and pressure.

Benchmarking was performed with the sensor in an oven, allowing controlled variation of temperature, pressure, and flow rate with an automated program. The pressure and temperature steps can be seen in FIG. 29. For each step, the flow rate was varied as shown in FIG. 25. The frequency and temperature are plotted in FIG. 30 vs time where the frequency can be seen to generally progress downwards as the temperature is increased, consistent with the reduction of the Young's modulus of the steel tubing at elevated temperature. The frequency can be seen to pass through a distinct minima at each temperature; this minima corresponds to the highest pressure. Maximum fluid pressure both creates the highest fluid density and maximum tube dilation wherein both effects decrease the resonant frequency. For each discrete pressure and temperature step, the sensitivity of the sensor to mass or volumetric flow was measured (degrees/mL/min), as well as the offset (degrees). The results are plotted in FIGS. 31 and 32, respectively. The sensitivity varies little over the entire pressure and temperature range, but it does trend slightly downwards at elevated pressures and lower temperatures. The offset in FIG. 32 shows a significant variation over the range of the pressure and temperature. In this regard, in accordance with some examples, the sensor's phase offset is nulled at the appropriate pressure and temperature before used to optimize performance.

Density

Figure 33:
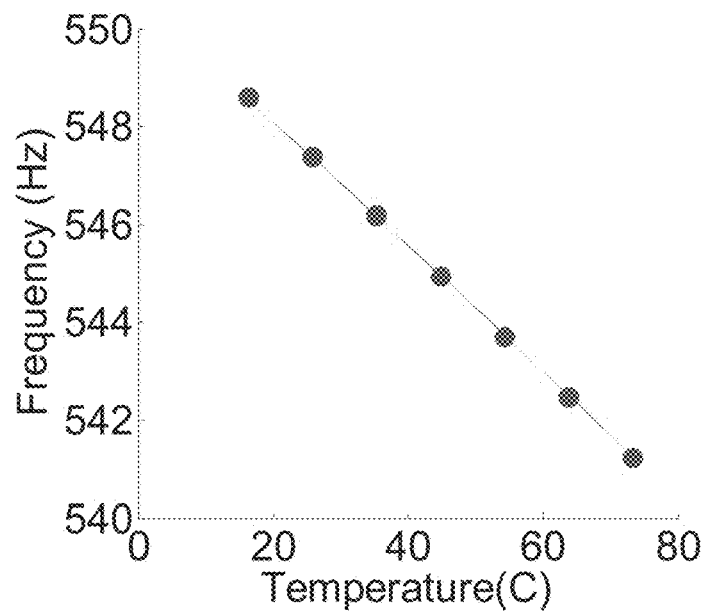
FIG. 33 shows, as part of flowmeter calibration to provide functioning as a densitometer, average frequency vs. temperature measured with resonator tube empty except for air.
Figure 34:
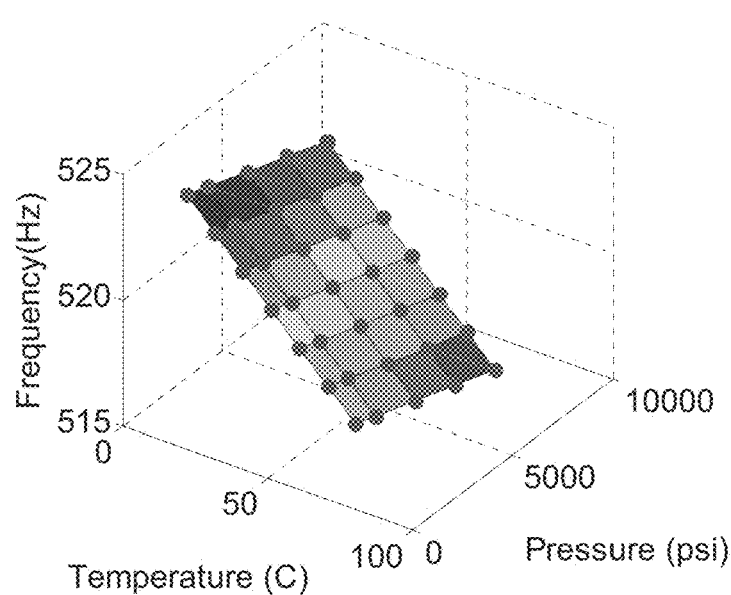
FIG. 34 shows, as part of the flowmeter calibration to provide functioning as a densitometer, average frequency vs pressure and temperature for a water-filled resonator tube along with a second order two-dimensional polynomial.
Figure 35:
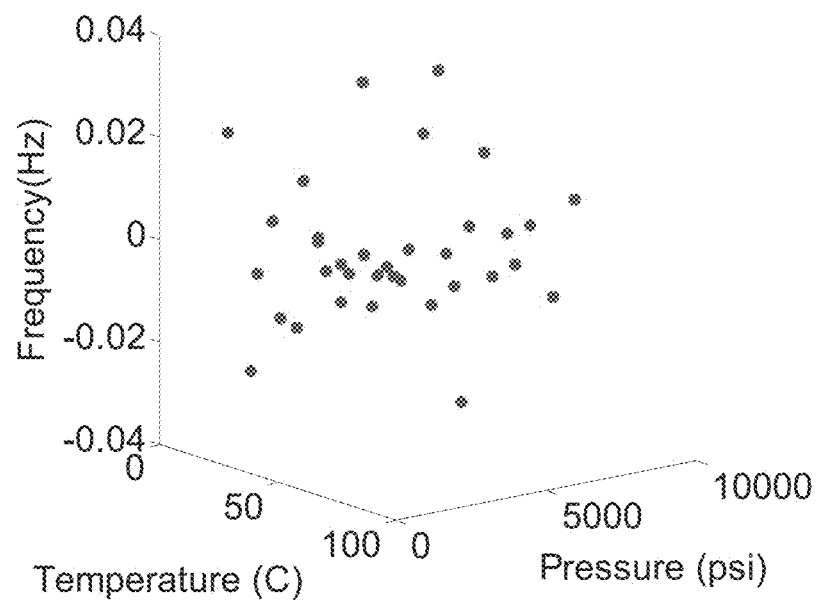
FIG. 35 shows, as part of the flowmeter calibration to provide functioning as a densitometer, discrepancy between fit of polynomial an frequency measurements shown in FIG. 34.
Figure 36:
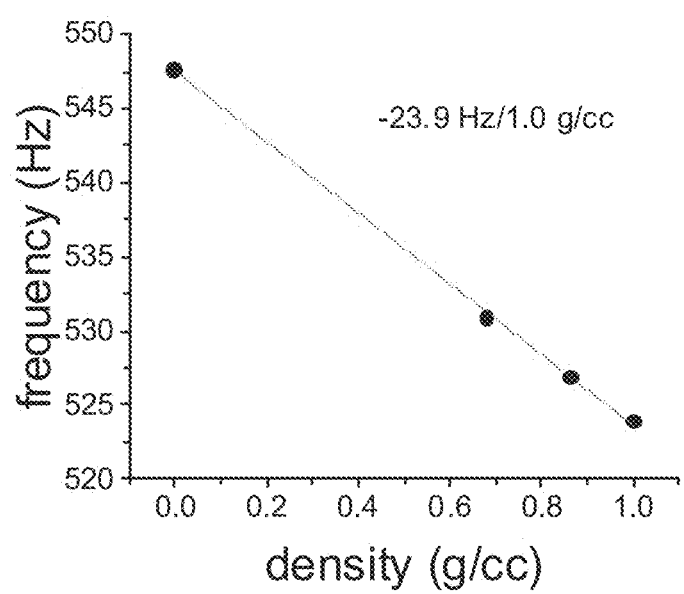
FIG. 36 shows, as part of the flowmeter calibration to provide functioning as a densitometer, frequency vs. fluid density for air, heptane, toluene, and water at ambient temperatures and pressure to demonstrate sensitivity of sensor frequency to fluid density.

In accordance with some examples, density is measured simultaneously with flow rate, after calibration. FIGS. 33 and 34 show the input data used for calibration of the densitometer, including frequency measurements for several temperatures for an empty tube and the same for a water-filled tube at series of temperatures and pressures. FIG. 34 plots the average of this frequency (circles) for the water-filled tube vs pressure and temperature, which clearly follow a smooth trend which can be easily fit to a 2nd order polynomial in pressure and temperature. The discrepancy between the data and this fit is shown in FIG. 35, where the discrepancy is never greater than 0.04 Hz. Based on this multi-step calibration, a density sensitivity is expected of order 23 Hz/(1.0 g/cc), which is more explicitly shown at in FIG. 36 for 4 fluids at ambient temperature and pressure. Given this sensitivity, and the 0.04 Hz maximum discrepancy measured above, this sets an uncertainty of (0.04 Hz/23 Hz)*1.0 g/cc=0.002 g/cc. By characterizing the temperature-dependence of the air-filled tube frequency and the same for the water-filled tube, the latter as a function of temperature and pressure, the sensor is calibrated as a densitometer using the method of, for example, Lagourette et al., Meas. Sci. Technol. 3, 699 (1992), which is incorporated herein by reference.

Further details of using the PVT apparatus in conjunction with a wellbore tool and methods for implementing the PVT apparatus are described in U.S. Patent Application Publication No. 2014/0260586 and PCT International Publication No. WO 2014/158376, each of which is incorporated herein by reference in its entirety.

Generally, microfluidic Coriolis-effect mass flow meters are not suitable for use in downhole conditions to measure the mass flow rate of a borehole fluid. Firstly, crude oils contain semi-dissolved solids such as asphaltenes which can easily flocculate into micron-sized particles. This flocculation can be naturally occurring in oilfield reservoirs or be exacerbated by depressurization during the fluid sampling stage with a formation tester wireline tool. These flocculates would rapidly clog up a nanoporous membrane and prevent the fluid of interest from being transported to the flowmeter. However, it has been discovered that such asphaltenes can pass through such nanoporous membranes under certain circumstances, such as cross-flow. Secondly, even if the asphaltene flocculates were not to completely clog a membrane, the flow restriction that they could cause would necessitate a large pressure drop in order to draw flocculate-laden fluids through the membrane. In the course of dropping the pressure, two detrimental phenomena could occur: a reduction of the pressure below the Asphaltene Onset Pressure (AOP) or even lowering the pressure below the Bubblepoint Pressure (Pb). However, Applicants have discovered that by inducing such challenging live crude oil fluids to flow through the membrane at microfluidic flow rates with pressure differentials no greater than a few psi, a Coriolis-effect mass flow meter can be utilized in downhole conditions to measure the mass flow rate such fluids.

The methods and processes described above such as, for example, operation of valves and pistons and the performance of the various described fluid and/or flow analyses, may be performed by a processing system. The processing system may correspond at least in part to electronic control system 460, 760, 960 described above. The term "processing system" should not be construed to limit the embodiments disclosed herein to any particular device type or system. The processing system may include a single processor, multiple processors, or a computer system. Where the processing system includes multiple processors, the multiple processors may be disposed on a single device or on different devices at the same or remote locations relative to each other. The processor or processors may include one or more computer processors (e.g., a microprocessor, microcontroller, digital signal processor, or general purpose computer) for executing any of the methods and processes described above. The computer system may further include a memory such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCM-CIA card), or other memory device.

The methods and processes described above may be implemented as computer program logic for use with the computer processor. The computer processor may be for example, part of a system such as system 200 described above. The computer program logic may be embodied in various forms, including a source code form or a computer executable form. Source code may include a series of computer program instructions in a variety of programming languages (e.g., an object code, an assembly language, or a high-level language such as C, C++, Matlab, JAVA or other language or environment). Such computer instructions can be stored in a non-transitory computer readable medium (e.g., memory) and executed by the computer processor. The computer instructions may be distributed in any form as a removable storage medium with accompanying printed or electronic documentation (e.g., shrink wrapped software), preloaded with a computer system (e.g., on system ROM or fixed disk), or distributed from a server or electronic bulletin board over a communication system (e.g., the Internet or World Wide Web).

Alternatively or additionally, the processing system may include discrete electronic components coupled to a printed circuit board, integrated circuitry (e.g., Application Specific Integrated Circuits (ASIC)), and/or programmable logic devices (e.g., a Field Programmable Gate Arrays (FPGA)). Any of the methods and processes described above can be implemented using such logic devices.

Any of the methods and processes described above can be implemented as computer program logic for use with the computer processor. The computer program logic may be embodied in various forms, including a source code form or a computer executable form. Source code may include a series of computer program instructions in a variety of programming languages (e.g., an object code, an assembly language or a high-level language such as C, C++ or JAVA). Such computer instructions can be stored in a non-transitory computer readable medium (e.g., memory) and executed by the computer processor. The computer instructions may be distributed in any form as a removable storage medium with accompanying printed or electronic documentation (e.g., shrink wrapped software), preloaded with a computer system (e.g., on system ROM or fixed disk), or distributed from a server or electronic bulletin board over a communication system (e.g., the Internet or World Wide Web).

To the extent used in this description and in the claims, a recitation in the general form of "at least one of [a] and [b]" should be construed as disjunctive. For example, a recitation of "at least one of [a], [b], and [c]" would include [a] alone, [b] alone, [c] alone, or any combination of [a], [b], and [c].

Although a few example embodiments have been described in detail above, those skilled in the art will readily appreciate that many modifications are possible in the example embodiments without materially departing from embodiments disclosed herein. Accordingly, all such modifications are intended to be included within the scope of this disclosure.

What is claimed is:

1. A downhole tool configured to characterize a formation fluid in a wellbore, the downhole tool comprising:
   a flow line;
   a membrane configured to allow a formation fluid to pass into the flow line while blocking water from entering the flow line;
   a density and mass flow meter configured to receive the formation fluid from the flow line, the density and mass flow meter including
      a resonator tube configured to receive the formation fluid,
      a magnet configured to apply a magnetic field to the resonator tube,
      an excitation source configured to apply an electrical excitation current to the resonator tube in the presence of the magnetic field to oscillate the resonator tube in a first oscillation mode, and
      a sensor system configured to sense vibration of the resonator tube in response to the application of the electrical excitation current wherein the sensor system includes;
   a first optical detector configured to generate a first signal that reflects oscillation of the resonator tube at a first location of the resonator tube;
   a second optical detector configured to generate a second signal that reflects oscillation of the resonator tube at a second location of the resonator tube, wherein the first location and the second location are different; and
   a processing system configured to (a) calculate mass flow rate of the formation fluid based on vibration sensed by the sensor system and (b) calculate density of the formation fluid based on vibration sensed by the sensor system.

2. The downhole tool of claim 1, wherein the processor is configured to calculate the mass flow rate of the formation fluid based on phase shift of the first signal and the second signal due to Coriolis effect from the formation fluid flowing within the resonator tube.

3. The downhole tool of claim 1, wherein the resonator tube is a metal tube.

4. The downhole tool of claim 1, wherein the resonator tube is comprised of a glass tube with a conductive metal coating.

5. The downhole tool of claim 1, wherein the resonator tube is electrically isolated from the flow line by an electrical isolator.

6. The downhole tool of claim 5, wherein the electrical isolator is comprised of two glass elements, each corresponding to a respective end of the resonator tube.

7. The downhole tool of claim 6, wherein the glass elements are comprised of doped glass.

8. A downhole tool configured to characterize a formation fluid in a wellbore, the downhole tool comprising:
a flow line configured to receive the formation fluid;
a piston configured to control pressure of the formation fluid in the flow line;
a pressure gauge configured to measure the pressure of the formation fluid in the flow line and to provide information to control the piston;
a membrane in communication with the flow line and configured to allow the formation fluid to pass through the membrane while blocking water from passing through the membrane;
a density and mass flow meter configured to receive the formation fluid after the formation fluid has passed through the membrane, the density and mass flow meter including
a resonator tube configured to receive the formation fluid,
a magnet configured to apply a magnetic field to the resonator tube,
an excitation source configured to apply an electrical excitation current to the resonator tube in the presence of the magnetic field to oscillate the resonator tube in a first oscillation mode, and
a sensor system configured to sense vibration of the resonator tube in response to the application of the electrical excitation current;
a first optical detector configured to generate a first signal that reflects oscillation of the resonator tube at a first location of the resonator tube;
a second optical detector configured to generate a second signal that reflects oscillation of the resonator tube at a second location of the resonator tube, wherein the first location and the second location are different; and
a processing system configured to (a) calculate mass flow rate of the formation fluid based on vibration sensed by the sensor system and (b) calculate density of the formation fluid based on vibration sensed by the sensor system.

9. The downhole tool of claim 8, wherein the processor is configured to calculate the mass flow rate of the formation fluid based on phase shift of the first signal and the second signal due to Coriolis effect from the formation fluid flowing within the resonator tube.

10. The downhole tool of claim 8, wherein the resonator tube is a metal tube.

11. The downhole tool of claim 8, wherein the resonator tube is comprised of a glass tube with a conductive metal coating.

12. The downhole tool of claim 8, wherein the resonator tube is electrically isolated from the flow line by an electrical isolator.

13. The downhole tool of claim 12, wherein the electrical isolator is comprised of two glass elements, each corresponding to a respective end of the resonator tube.

14. The downhole tool of claim 13, wherein the glass elements are comprised of doped glass.

15. The downhole tool of claim 8, further comprising a phase transition cell.

16. The downhole tool of claim 1, wherein the at least one sensor includes an optical detector that includes a light emitter and a light detector.

17. The downhole tool of claim 8, wherein the at least one sensor includes an optical detector that includes a light emitter and a light detector.

18. The downhole tool of claim 1, wherein the membrane includes a plurality of membranes.

19. The downhole tool of claim 1, wherein the processing system includes a spectrometer.

20. The downhole tool of claim 8, wherein the membrane includes a plurality of membranes.

21. The downhole tool of claim 8, wherein the processing system includes a spectrometer.

* * * * *